US009515961B2

(12) United States Patent
Guo et al.

(10) Patent No.: US 9,515,961 B2
(45) Date of Patent: *Dec. 6, 2016

(54) CREDIT FLOW CONTROL SCHEME IN A ROUTER WITH FLEXIBLE LINK WIDTHS UTILIZING MINIMAL STORAGE

(71) Applicant: Sonics, Inc., Milpitas, CA (US)

(72) Inventors: Liping Guo, Palo Alto, CA (US); Doddaballapur N. Jayasimha, Sunnyvale, CA (US); Jeremy Chan, San Jose, CA (US)

(73) Assignee: Sonics, Inc., San Jose, CA (US)

( * ) Notice: Subject to any disclaimer, the term of this patent is extended or adjusted under 35 U.S.C. 154(b) by 196 days.

This patent is subject to a terminal disclaimer.

(21) Appl. No.: 14/265,037

(22) Filed: Apr. 29, 2014

(65) Prior Publication Data

US 2014/0314076 A1    Oct. 23, 2014

Related U.S. Application Data

(63) Continuation of application No. 13/219,339, filed on Aug. 26, 2011, now Pat. No. 8,711,867.

(51) Int. Cl.
*H04L 12/937* (2013.01)
*H04L 12/701* (2013.01)
*H04L 12/713* (2013.01)

(52) U.S. Cl.
CPC ............. *H04L 49/253* (2013.01); *H04L 45/00* (2013.01); *H04L 45/586* (2013.01)

(58) Field of Classification Search
CPC .... H04L 45/253; H04L 45/586; H04L 45/00
See application file for complete search history.

(56) References Cited

U.S. PATENT DOCUMENTS 5,841,775 A * 11/1998 Huang .................... H04L 45/00
                                                        370/388
5,948,089 A     9/1999 Wingard et al.
(Continued)

FOREIGN PATENT DOCUMENTS

EP              2748708 A1    7/2014
KR         1020140063736      5/2014
WO       WO 2013/032910 A1    3/2013

OTHER PUBLICATIONS

Notification of Transmittal of the International Search Report and the Written Opinion of the International Searching Authority for International Patent Application No. PCT/US2012/052288, mailed Nov. 8, 2012, 8 pages, International Searching Authority/US, Alexandria, Virginia, USA.

(Continued)

*Primary Examiner* — Ian N Moore
*Assistant Examiner* — Justin T Van Roie
(74) *Attorney, Agent, or Firm* — Rutan & Tucker, LLP

(57) ABSTRACT

A method includes receiving flits forwarded from an upstream router into a first input virtual channel (VC) associated with an input port. The flits are associated with packets originated from a first Intellectual Property (IP) core and forwarded to a second IP core. The flits are stored in a VC storage associated with the first input VC. The method further includes performing link width conversion based on a width of the flits being different from a width of an output port. Link width conversion includes accumulation of the flits when the width of the output port is wider and unpacking of the flits when the width of the output port is narrower. Credits are generated based on the flits being forwarded from the first input VC to the output port. The credits are sent to the upstream router to enable receiving more flits from the upstream router.

18 Claims, 14 Drawing Sheets

(56) References Cited

U.S. PATENT DOCUMENTS

| | | | |
|---|---|---|---|
| 6,182,183 | B1 | 1/2001 | Wingard et al. |
| 6,330,225 | B1 | 12/2001 | Weber et al. |
| 6,359,861 | B1 * | 3/2002 | Sui .................. H04L 49/205 370/230 |
| 6,370,145 | B1 | 4/2002 | Dally et al. |
| 6,578,117 | B2 | 6/2003 | Weber |
| 6,617,877 | B1 | 9/2003 | Cory et al. |
| 6,725,313 | B1 | 4/2004 | Wingard et al. |
| 7,093,024 | B2 | 8/2006 | Craddock et al. |
| 7,120,712 | B2 | 10/2006 | Wingard et al. |
| 7,251,256 | B1 | 7/2007 | Barry et al. |
| 7,325,221 | B1 | 1/2008 | Wingard et al. |
| 8,576,879 | B2 | 11/2013 | Scandurra et al. |
| 8,711,867 | B2 | 4/2014 | Guo |
| 2002/0051427 | A1 | 5/2002 | Carvey |
| 2002/0129173 | A1 | 9/2002 | Weber et al. |
| 2002/0196796 | A1 | 12/2002 | Ambe et al. |
| 2003/0004699 | A1 | 1/2003 | Choi et al. |
| 2003/0074520 | A1 | 4/2003 | Weber et al. |
| 2003/0118048 | A1 | 6/2003 | Dally et al. |
| 2004/0177186 | A1 | 9/2004 | Wingard et al. |
| 2007/0094429 | A1 | 4/2007 | Wingard et al. |
| 2007/0233918 | A1 | 10/2007 | Check et al. |
| 2008/0144670 | A1 | 6/2008 | Goossens et al. |
| 2008/0151909 | A1 | 6/2008 | Scott et al. |
| 2011/0026405 | A1 | 2/2011 | Tagagi et al. |
| 2013/0051397 | A1 | 2/2013 | Guo et al. |

OTHER PUBLICATIONS

International Preliminary Examination for International Patent Application No. PCT/US2012/052288, mailed Mar. 13, 2014, 7 pages, International Bureau of WIPO.

Non-Final Office Action for U.S. Appl. No. 13/219,339 mailed Apr. 10, 2013, 31 pages. U.S. Patent and Trademark Office, Alexandria VA USA.

Notice of Allowance for U.S. Appl. No. 13/219,339 mailed Dec. 9, 2013, 11 pages. U.S. Patent and Trademark Office, Alexandria VA USA.

Supplemental Notice of Allowability for U.S. Appl. No. 13/219,339 mailed Jan. 29, 2014, 5 pages. U.S. Patent and Trademark Office, Alexandria VA USA.

Wingard, Drew, Socket-Based Design Using Decoupled Interconnects, 2002, 30 pages, Interconnect-Centric Design for Advanced SOC and NOC.

Weber, Wolf-Dietrich, "Efficient Shared DRAM Subsystems for SOCs", Sonics, Inc., 2001, 6 pages.

OCP (Open Core Protocol) Specification, Release 2.0, OCP International Partnership 2003 OCP-IP Association, pp. 210 total.

Wingard, Drew, "A Non-Blocking Intelligent Interconnect for AMBA-Connected SoCs", Sonics, Inc., CoWare Arm Developer's Conference, Oct. 6, 2005, 39 pages.

Weber, Wolf-Dietrich, et al., "A quality-of-service mechanism for interconnection networks in system-on-chips", 1530-1591/05, 2005 IEEE, 6 pages.

Wingard, Drew: Tiles: "The Heterogeneous Processing Abstraction for MPSoC", Presentation Notes, 2004, Sonics, Inc., 35 p.

Extended European Search Report for European Patent Application No. EP 12826809.1 mailed Mar. 26, 2015, 8 pages; European Patent Office, Munich, Germany.

Office Action for European Patent Application No. EP 12826809.1 mailed Jan. 21, 2016; 7 pages; European Patent Office, Munich, Germany.

*Ex Parte Wada and Murphy*, U.S. Patent and Trademark Office Board of Patent Appeals and Interferences Decision on Appeal for Appeal No. 2007-3733 dated Jan. 14, 2008, 9 pages. Alexandria, Virginia USA.

* cited by examiner

CREDIT FLOW CONTROL SCHEME IN A ROUTER WITH FLEXIBLE LINK WIDTHS UTILIZING MINIMAL STORAGE

RELATED APPLICATIONS

This application claims the benefit of and is a continuation of Non-Provisional application Ser. No. 13/219,339, filed Aug. 26, 2011, titled "Credit Flow Control Scheme in a Router with Flexible Link Widths Utilizing Minimal Storage", and is herein incorporated by reference.

NOTICE OF COPYRIGHT

A portion of the disclosure of this patent document contains material that is subject to copyright protection. The copyright owner has no objection to the facsimile reproduction by anyone of the interconnect as it appears in the Patent and Trademark Office Patent file or records, but otherwise reserves all copyright rights whatsoever.

FIELD

Embodiments of the present invention generally relate to the field of data routing, and in some embodiments, specifically relate to using flexible link widths to route data using routers in a flexible network.

BACKGROUND

A typical network may include many routers. A router may implement various routing and flow control functions to route the data from a source location to an intended destination location.

SUMMARY

Some embodiments of the invention may include one or more routers in a routing fabric. The routing fabric may be part of interconnection networks for computer systems, or it may be part of a Network on a Chip (NoC). The NoC may compass systems that include an integrated circuit. The routers are configured to propagate flits from source locations to destination locations along inter-router physical links of the routing fabric of the NoC. Each of the routers has one or more input ports and one or more output ports. Each of the routers is configured to implement routing and flow control functions required to buffer any incoming flits from both (i) one or more master Intellectual Property (IP) cores and (ii) one or more slave IP cores. Each of the two or more routers is also configured to perform link width conversion when width of signal wires connected to an output port is different from width of signal wires connected to an input port. Further, each of the two or more routers is configured to use multiple input virtual channels (VC's) with each input port, where each of the input VCs is associated with a first storage unit reserved only for the incoming flits associated with that input VC and a second storage unit shared among the incoming flits of all of the input VCs associated with the input port. In addition, each of the routers is configured to use multiple output VCs with each output port, where each of the output VCs is used to forward outgoing flits to a downstream router, and where each of the output VC is associated with a credit count. The flow of the flits through the routers is based on using credit generation and credit tracking.

BRIEF DESCRIPTION OF THE DRAWINGS

The multiple drawings refer to the embodiments of the invention.

Figure 1A:
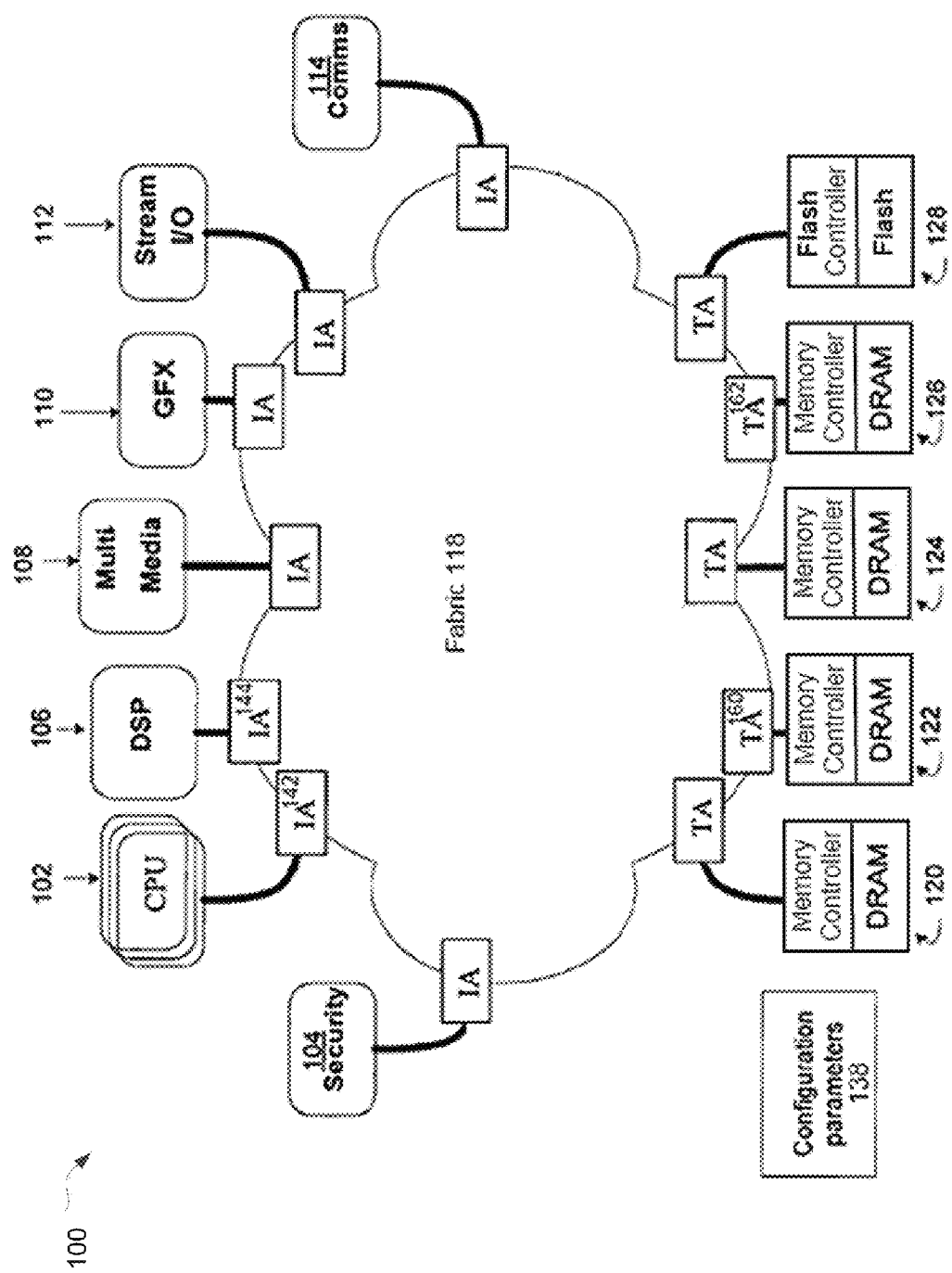
FIG. 1A illustrates a block diagram of an embodiment of a System-on-a-Chip (SoC).

While the invention is subject to various modifications and alternative forms, specific embodiments thereof have been shown by way of example in the drawings and will herein be described in detail. The invention should be understood to not be limited to the particular forms disclosed, but on the contrary, the intention is to cover all modifications, equivalents, and alternatives falling within the spirit and scope of the invention.

DETAILED DISCUSSION

In the following description, numerous specific details are set forth, such as examples of named components, connections, types of circuits, etc., in order to provide a thorough understanding of the present invention. It will be apparent, however, to one skilled in the art that the present invention may be practiced without these specific details. In other instances, well known components or methods have not been described in detail but rather in a block diagram in order to avoid unnecessarily obscuring the present invention. Further specific numeric references (e.g., a first router, a second router, etc.) may be made. However, the specific numeric reference should not be interpreted as a literal sequential order but rather interpreted that the first array is different from a second array. Thus, the specific details set forth are merely exemplary. The specific details may vary from and still be contemplated to be within the spirit and scope of the present invention.

In general, various methods and apparatus associated with routing information through one or more routers using a credit-based flow control mechanism are discussed. The method enables using pipelined virtual channel (VC) routers with flexible credit flow control to handle link width conversion. Credit generation and credit tracking are performed to synchronize activities between two adjacent routers based on the availability of storage in a downstream router to support the link width conversion.

The link width conversion supports demands that the credit generation and return are handled differently for narrow-to-wide and wide-to-narrow conversions. For example, when the narrow-to-wide conversion is necessary, when one flit leaves the router more than one credit may be accumulated. The accumulated credits is remembered and returned to upstream router one per cycle via a credit channel when certain conditions are met.

For some embodiments, a method to propagate flits using a fabric of a Network on a chip (NoC) is disclosed. The method includes receiving the flits forwarded from an upstream router into an intended input virtual channel (VC) of a plurality of input VCs associated with an input port. The flits are associated with packets originated from a first Intellectual Property (IP) core and to be forwarded to a second IP core. The flits are stored in a VC storage associated with the intended input VC. Link width conversion may be performed based on a width of the input flits being different from a width of an output port. The link width conversion may include accumulation of the flits when the width of the output port is wider. The link width conversion may include unpacking of the flits when the width of the output port is narrower. Credits are generated based on the flits being forwarded from the input VC to the output port. The credits may be sent to the upstream router to enable receiving more flits from the upstream router. When the upstream router has no credit, it does not send any flits until more credits are received.

Overview

Embodiments of the invention use a shared storage and a reserved storage for each input VC to store the incoming flits received from an upstream router. The incoming flits are processed by a configurable pipelined router based on a credit generation and credit return scheme that improves utilization of the VC storage for a given link efficiency. A credit tracking module in the router is associated with each output port and configured to keep track of credit usage of each of the output VCs of the output port. Only the output VCs that have non-zero credit count are allowed to forward the outgoing flits to the downstream router with or without the link width conversion occurring at the downstream router. A credit generation module in the router is associated with each input VC and is configured to monitor the occupancy status of the VC storage and to generate the credits when the incoming flits depart from the VC storage. The router includes logic to accumulate the incoming flits when there is a narrow-to-wide link width conversion and logic to unpack the incoming flits when there is a wide-to-narrow link width conversion. The router may be part of a set of heterogeneous routers.

IP Cores and Fabric

FIG. 1A illustrates a block diagram of an embodiment of a System-on-a-Chip. Diagram 100 includes multiple initiator IP cores (IC) and multiple target IP cores (TC) that communicate read and write requests as well as responses to those requests over a fabric 118. The fabric 118 may also be referred to as a packet-based switch network because the data transferred within the fabric is in the forms of packets. Some examples of an IC may include a CPU IP core 102, an on-chip security IP core 104, a digital signal processor (DSP) IP core 106, a multimedia IP core 108, a graphics IP core 110, a streaming input-output (I/O) IP core 112, a communications IP core 114 (e.g., a wireless transmit and receive IP core with devices or components external to the chip, etc.), etc.

Each IC may have its own initiator agent (IA) (e.g., IA 142, IA 144, etc.) to interface with the fabric 118. Some examples of a TC may include DRAM IP core 120 through DRAM IP core 126 and FLASH memory IP core 128. Each TC may have its own target agent (TA) (e.g., TA 160, TA 162) to interface with the fabric 118. Each of the DRAM IP cores 120-126 may have an associated memory controller. Similarly, the flash memory 128 is associated with a flash controller. All of the ICs 102-114 and TCs 120-128 may operate at different performance rates (i.e. peak bandwidth, which can be calculated as the clock frequency times the number of data bit lines (also known as data width), and sustained bandwidth, which represents a required or intended performance level). The fabric 118 may be part of an integrated circuit, such as System-on-a-Chip (SoC).

Routers

Figure 1B:
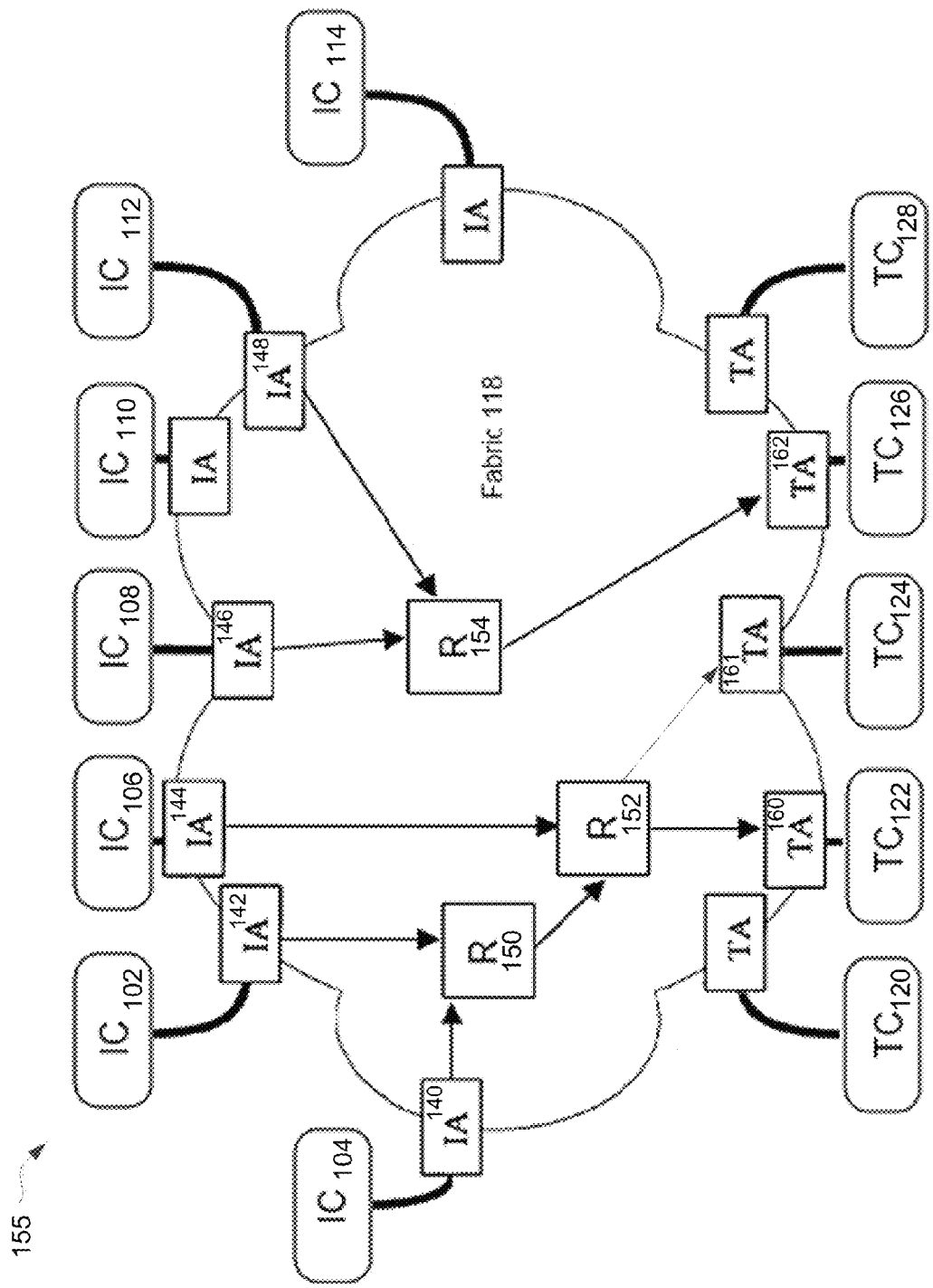
FIG. 1B illustrates a block diagram of an embodiment of a fabric and routers included in the fabric.

FIG. 1B illustrates a block diagram of an embodiment of a fabric and routers included in the fabric. Diagram 155 is similar to the diagram 100 but with the addition of the routers in the fabric 118. The diagram 155 illustrates a request network where the information flows from the ICs and IAs to the TCs and TAs. Although not illustrated, there is a corresponding response network that connect the TCs and the TAs to the IAs and ICs. The routers may be used to route packets within the fabric 118 from a source location (e.g., the ICs 102-114) to a destination location (e.g., the TCs 120-128) in the integrated circuit. There may be multiple routers in the fabric 118. The number of routers may be implementation specific (e.g., topology used, area requirement, latency requirement, etc.). The data sent from the IC 102 to the TC 122 may be packetized by packetizing logic associated with the IA 142 before being sent into the fabric 118. The packets may pass through the routers 150 and 152. The packets may then be depacketized by depacketizing logic associated with the TA 160 when they leave the fabric 118. Similarly, the data sent from the IC 108 to the TC 126 may be packetized by packetizing logic associated with the IA 146 before being sent into the fabric 118. The packets may pass through the router 154. The packets may then be depacketized by depacketizing logic associated with the TA 162 when they leave the fabric 118. Also illustrated in FIG. 1B are the data flowing from the router 152 to the TA 161 of the TC 124, and the data flowing from the IC 112 to the IA 148 and the router 154.

The packets may be broken into small pieces called flits (or flow control units) when they are sent between two routers. A flit may take several cycles to transfer. A smallest physical unit of information at the physical layer that is transferred across one physical link in one cycle is called a phit. A flit can consist of one or more phits. The router implements routing and flow control functions required to buffer the incoming flits and forward them to their intended destinations. The router is pipelined at flit level and its architecture follows a virtual channel (VC) router and configured for Network-on-Chip (NoC) applications. The router may include multiple links that are used in a shared fashion as virtual channels. There is no physical input or output connection or ports for each of the VC. Each VC is associated with a VC identification (VC ID) number and may hold the state needed to coordinate the handling of the flits of a packet over a channel. This state may identify the output channel of the current router for the next hop of the route and the state of the virtual channel (idle, waiting for resources, or active). The VC may also include pointers to the flits of the packet that are buffered on the current router and the number of flit buffers available on the next router.

The first flit of a packet is called the header flit. The header flit holds information about the packet's route (e.g., the destination address) and sets up the routing behavior for all subsequent flits associated with the packet. The header flit may also include the VC number that it is associated with. The header flit may be followed by zero or more body flits. The body flits contain the actual payload of data. The final flit is called a tail flit. The tail flit may perform some bookkeeping to close the connection between the two routers.

Figure 1C:
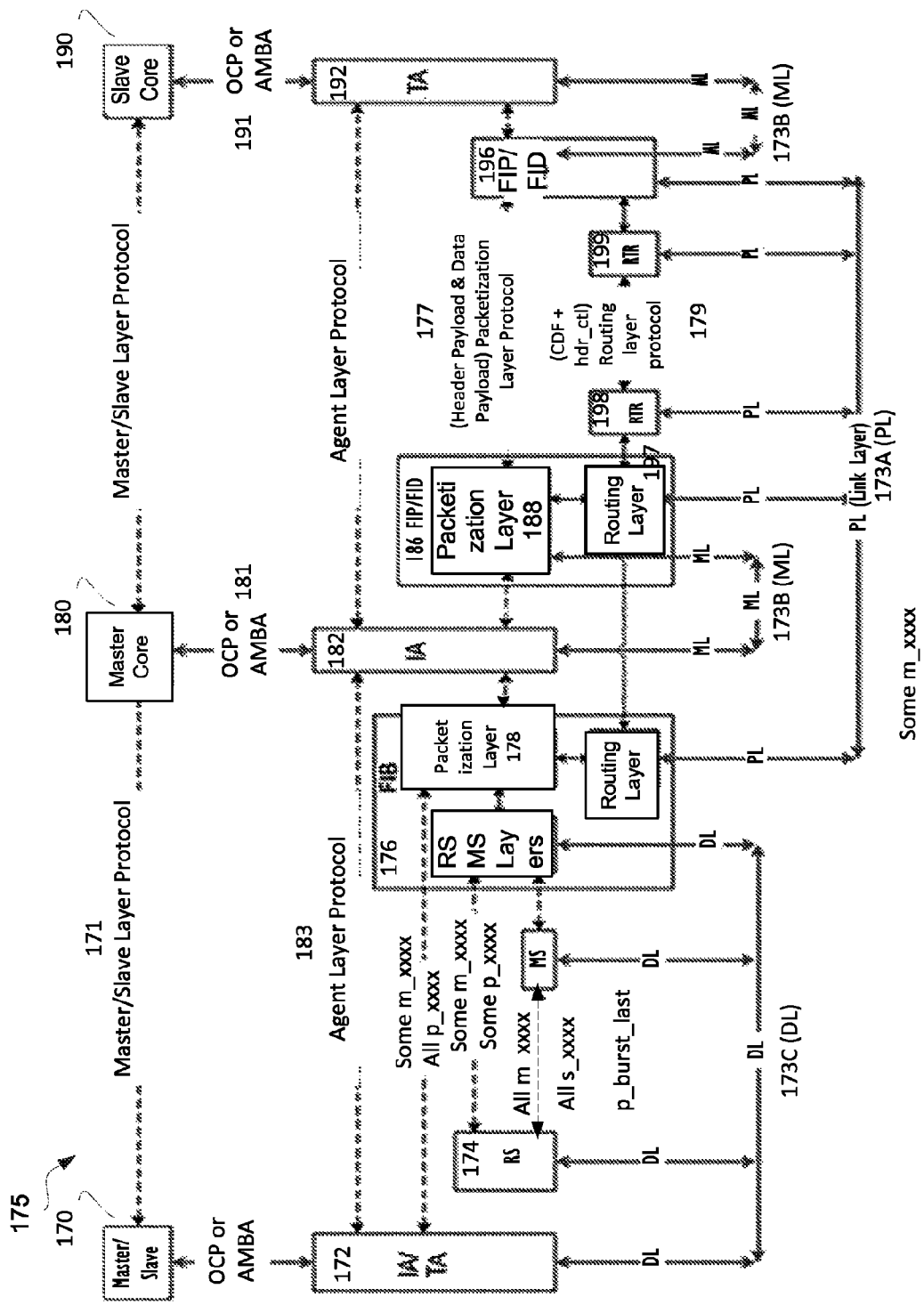
FIG. 1C illustrates a block diagram of an embodiment of interfaces and protocol layers and packetized protocol layers used by components of a network.

FIG. 1C illustrates a block diagram of an embodiment of interfaces and protocol layers and packetized protocol layers used by components of a network. Diagram 175 includes master cores 170, 180 and a slave core 190. Each of the master cores 170, 180 and the slave core 190 may correspond to the IC or TC illustrated in FIGS. 1A and 1B. The diagram 175 also includes fabric interface logic 186 and 196, each of which may include packetization and depacketization logic. Requests from the master core 180, such as command to get data from memory, are expressed in a standard interface protocol such as OCP or the Advanced Microcontroller Bus Architecture (AMBA) protocol or using a proprietary interface protocol. The requests are then received by the IA 182.

The OCP socket may be used for virtually any application, while the AMBA bus interface may be used by a single unique application, where all of the arbitration logic and interface circuitry is defined for that particular application. The request may then be packetized by the fabric interface logic 186, and the packets are sent into the fabric 118. The packets may be routed by the routers 198 and 199 as flits before arriving at the fabric interface 196. The fabric interface 196 then depacketizes the packets into messages and then send the messages to the TA 192. The TA 192 then sends the messages to the slave core 190 using the OCP or AMBA or any socket protocol 191. Each of the routers 198 and 199 may be configured to perform some link width conversion such that an accumulated link width conversion by all of the routers will ensure that the packets arriving at the fabric interface 196 will be as expected by the fabric interface 196. When there is a response message by the slave core 190, the response message is transmitted to the TA 192 and then packetized by the fabric interface 196. The routers 198 and 199 may again perform the link width conversion such that when the packets associated with the response message arrive at the switch interface 186, they will match with what is expected by the fabric interface 186.

The double-arrowed solid lines in FIG. 1C represent physical links connecting the components of the flexible network. The horizontal double-arrowed dotted lines drawn between the components indicate that a special type of layer protocol is used between those components that may or may not be connected to one another via any physical link. For example, at the packetization layer 188, a packetization layer protocol 177 is used for communication. The packetization layer 188 is responsible for packetization/depacketization, reformatting the data into a common data format (CDF) and vice versa. The functionality of the packetization layer 188 may exist in the fabric interface packetizer (FIP), fabric interface depacketizer (FID). The FIP and FID are responsible for facilitating packing and/or unpacking the non-packable external socket on the request network for write bursts and on the response network for read bursts.

At the routing layer 197, a routing layer protocol 179 is used for communication between the routers. The routing layer 197 is responsible for handling routing and width conversion related functionality. As shown in FIG. 1C, the functionality of the routing layer 197 may exist in the routers and in the FIP and FID. The RS 174 is responsible for data transfer of the flits between adjacent routers for flow control and for virtual channel management. A layer protocol 183 is also used for communications between an IA request side and a TA request side, and between a TA response side and an IA response side. Communication among the components illustrated on the bottom of FIG. 1C is based on message links (ML) 173B, packet links (PL) 173A, etc. For example, the ML 173B is used to connect the IA 182 with the fabric interface 186; the PL 173A is used to connect the fabric interface 186 with the router 198, and the router 198 with the 199.

The message link (ML) is the interface between initiator agents (IA) and the fabric interface packetizer (FIP) or fabric interface depacketizer (FID), and between the target agent (TA) and its associated FID or FIP. The ML protocol is a synchronous point-to-point unidirectional protocol with a master and a slave. It defines the interface bundles internal to the agents. The ML is used to capture the socket information from the socket interface protocols such as OCP or AMBA AXI. The ML is used as the agent internal interface protocol at the interface between the agents (IA or TA) and the packetizers or depacketizers.

Figure 2:
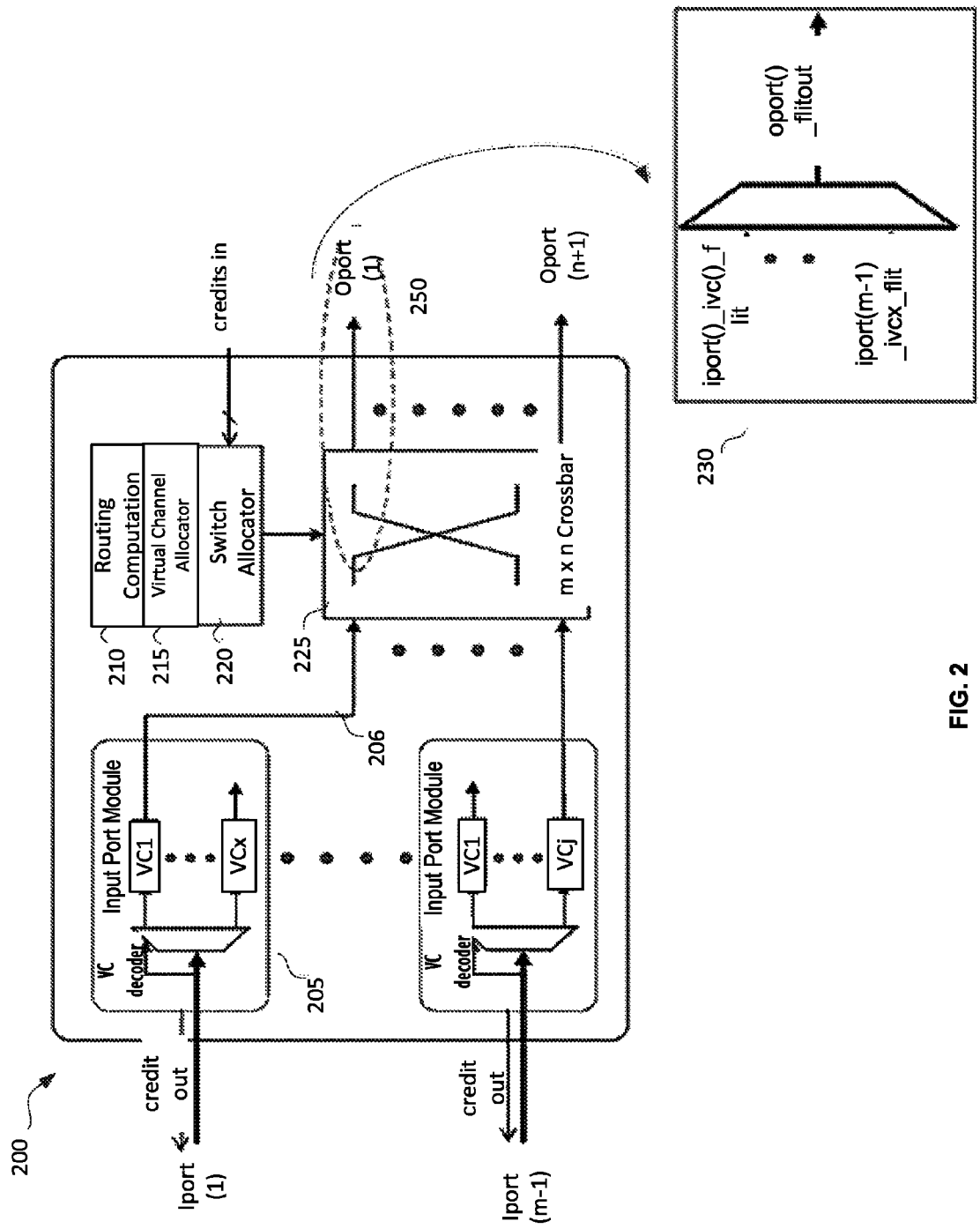
FIG. 2 illustrates some components of an embodiment of a router.

FIG. 2 illustrates some components of an embodiment of a router. Router 200 may be composed of decision-making modules, which govern the shared resources. The decision-making modules may include the input-buffering module 205, the route-computing module 210, the virtual channel allocation module 215, the switch allocation module 220, and the flow control module (shown in FIG. 5). The shared-resources may include the input VC buffer storage 325 (shown in FIG. 3), the crossbar switch 225, and the output ports 250. The shared buffer storage 325 is based on each input port and may be implemented as a content addressable memory (CAM). When active, the decision-making modules may coordinate with each other through the states of the input VCs. To advance, a flit may undergo several operations. An incoming header flit needs to go through the operations of buffer write (BW), route computation (RC), virtual channel allocation (VA), switch allocation (SA), switch traversal (ST), and link traversal (LT) before it arrives at the next hop. The body and tail flits of the same packet inherit the outgoing VC from the header flit and may only proceed through operations of BW, SA, ST, and LT. Among those operations, the RC and VA may be considered as packet level procedures and the rest of the operations may be considered as flit-level procedures.

The BW refers to an action of loading the newly arrived flits into the correct input port IVC storage. The RC refers to a process of extracting the route information from the header flit of a packet at each fabric network hop. The per hop route information may include an output port ID and an output VC ID. The VA refers to a process of arbitrating among various packets requesting for the same output VC and allocating the requested output VC to the arbitration winner. Only one output VC can only be allocated to one packet at any time. The SA refers to a process of arbitrating among the output VCs belonging to the same output port and determining which of the output VCs is to be granted access to an output port. An output port can only be allocated to one output VC at any time. The ST refers to a process in which a flit leaves the VC storage associated with an input VC of an input port and traverses to the output port. The LT refers to a process in which a flit leaves the current hop and propagates along the physical link connecting the fabric network entities (FID, FIP, and router).

The decision-making modules manage both the packet-level procedures and the flit-level procedures. The input port module 205 is configured to load the incoming flits into the intended VC buffer storage 325. The route computing module 210 is configured to examine the routing field in a header flit of a packet and computes the output port and the output VC through which the packet should be routed.

The packets are routed from the source to the destination using an appropriate deadlock-free routing scheme. The routes may be computed at the source or at each hop. For illustration purposes, a source based routing scheme is assumed; however, it should be noted that embodiments of the invention may also be used with other routing schemes. A designer knows exactly what he/she wants for each core including the appropriate data width requirement. The designer also has different requirements in getting the packets from one IP core to another IP core, including the paths, the latency, the number of hops, etc. All of the requirements are taken into consideration to derive at the final structure of the fabric so that the designer's requirements are met. The final structure may be a number of routers, and the routers may have similar or different channel width for their input and output ports.

The virtual channel allocation (VA) module 215 is configured to arbitrate among the packets requesting for the same output VC and allocates the output VC to the arbitration winner if and only if the output VC has not been granted to any other input VCs at the time. The switch allocation (SA) module 220 is configured to arbitrate among output VCs belonging to the same output port and determines which output VC is granted to access the output port 250 of the crossbar switch 225. Block 230 illustrates the multiple flits competing for the output port. As mentioned, the source routing allows the designer to specify the output port that he/she wants the packet to pass through. As such, it may be possible that multiple flits try to request for the same output port or resource. This is resolved by arbitration. It may be noted that there are two levels of arbitration. The first arbitration is for multiple input VCs competing for an ouput VC and performed by the VA module 215. The second arbitration is for multiple output VCs competing for an output port and performed by the SA module 220. The connection 206 illustrates an example connection from the VC buffer storage 325 to an output port associated with the crossbar switch 225.

Upon completion of the switch allocation operations, a flit waiting in the VC storage 325 is granted access to an output port 250 of the crossbar switch 225. That flit may propagate through the crossbar switch 225 and the output port 250 to arrive at the next hop. The process of a flit propagating through the crossbar switch 225 is referred to as switch traversal. The process of a flit propagating along the inter-router physical link is referred to as link traversal.

Figure 3:
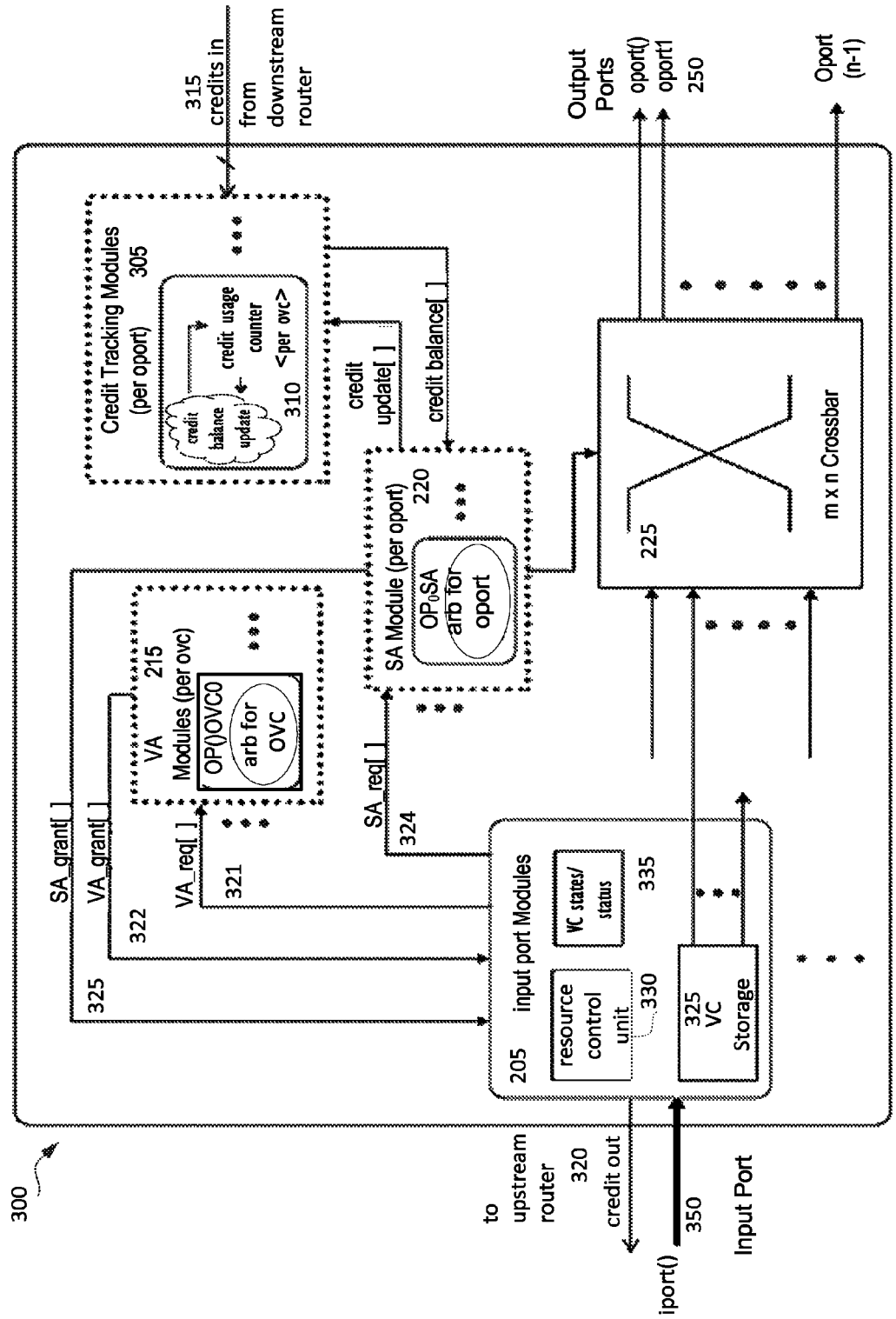
FIG. 3 illustrates a more detailed internal structure of an embodiment of the router.

FIG. 3 illustrates a more detailed internal structure of an embodiment of the router. Router 300 is similar to the router 200 illustrated in FIG. 2 but with the addition of the input port modules 205, the credit tracking modules 305 and related communication links. There may be multiple input port modules 205, one for each input port. Each of the input port modules 205 may include a VC storage 325, a resource control module 330, and a VC state/status module 335. The VC storage 325 may include shared VC storage and reserved or dedicated VC storage. The shared VC storage is shared among all of the input VCs within the same input port. The reserved VC storage is assigned to each input VC and can only be accessed by that input VC to prevent starvation. For example, when a flit arrives, it may be placed into the reserved VC storage. If the reserved VC storage is full, then the flit may be stored in the shared VC storage.

For some embodiments, each of the input port modules 205 may be configured to handle route computation and manage buffer write for the incoming flits. The input port modules 205 may also be configured to generate the credits for the upstream router and keep the states updated for its input VCs. The input port modules 205 may further be configured to issue VA requests 321 to and receive VA grants from the VA module 215, issue SA requests 324 to and receive SA grants 325 from the SA module 220, and control the reserved VC storage refill process. It may be noted that the components partition inside the input port modules 205 is a logical partition and not a physical partition. The logical partition used here is to illustrate the router operations and not to set the register transfer level (RTL) components boundaries.

Link Width Conversion

Figure 4A:
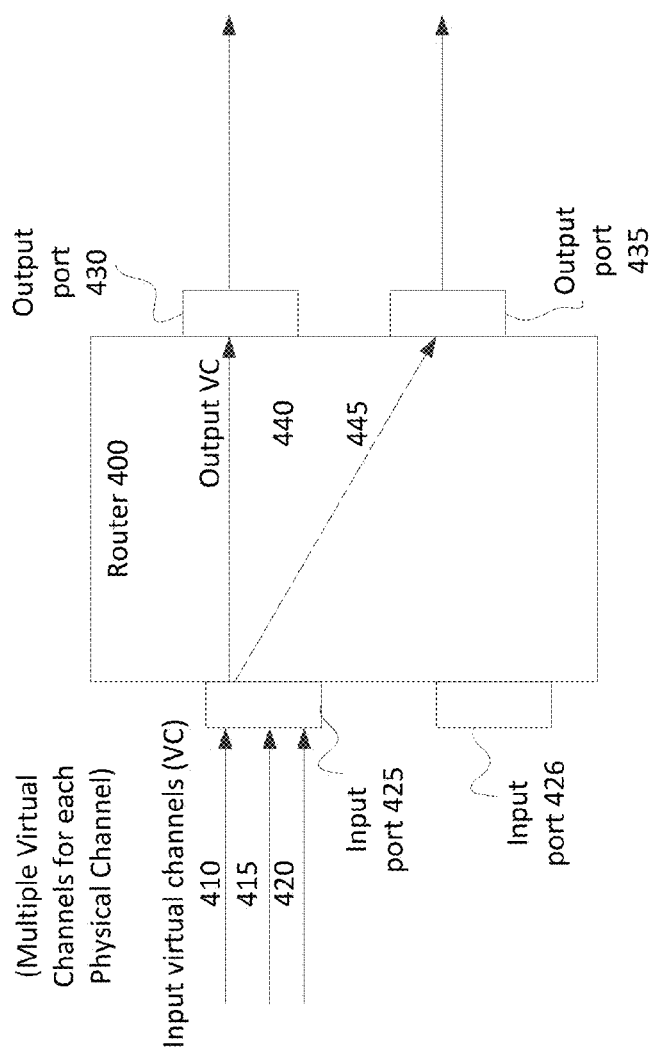
FIG. 4A illustrates an example of input and output ports of a router.

FIG. 4A illustrates an example of input and output ports of a router. Router 400 may include multiple input ports 425, 426 and multiple output ports 430, 435. The input port 425 may be associated with multiple input VCs 410, 415, 420. The packets or their associated flits may be received by the router 400 via the input VC 410 and then forwarded by the router 400 to the next hop via the output port 430. In operation, one input VC can be mapped to only output VC per route computation. As described in FIG. 3, the VA module 215 allocates the output VC, and the SA module 220 allocates the output port.

The packets include control or routing information to indicate the path that the fabric 118 is required to use to forward the packets to their intended destination. For example, the next hop for an incoming packet can be determined by looking at the first four (4) most significant bits (MSBs) of the routing field of the header flit where the first two MSBs may be used to determine the output port, and the next two MSBs may be used to determine the output VC. The width of each of the input ports 425, 426 and the width of the output ports 430, 435 of the router 400 may be configured independently. When the width of an input port and an output port pair is not the same, link width conversion may need to be performed. The specific type of link width conversion to be performed depends on the router connectivity and the associated widths of the ports. Based on the input port to output port width ratio, there may be three different types of link width conversion, including (a) Narrow-to-wide (N2W) conversion when the incoming narrower flits are accumulated to form a wider outgoing flit, (b) Wide-to-narrow (W2N) link width conversion when the incoming wider flits are broken up to match with the outgoing narrow flits, and (c) no width conversion when the incoming flits are passed through unmodified to the output port.

For some embodiments, the link width conversion ratio between the incoming flits and corresponding outgoing flits associated with the same packet may be determined based on using a ratio of a width parameter of the incoming link and a width parameter of the outgoing link (e.g., the PL link 173A illustrated in FIG. 1C). When an input VC of an input port has connections to multiple output ports (as illustrated with the output VC 440 and 445), it may be associated with more than one width conversion ratio. It may be noted that an input VC of a router may not be associated with a W2N link width conversion and a N2W link width conversion in a router to the same output port at the same time. However, an input VC may be associated with multiple wider output ports under N2W link with conversion based on the same (e.g., 1 to 4:4 input flits packed into 1 output flit) or different conversion ratios (e.g., 1 to 4 and 1 to 6). Similarly, an input VC may be associated with multiple narrower output ports under W2N link width conversion (e.g., 4 to 1:1 wider input flit broken into 4 narrower output flits) based on the same or different conversion ratio. For example, the output VC 440 may have more the input VCs 410 and 415 mapped to it and the VA module 215 may receive multiple requests simultaneously.

Figure 4B:
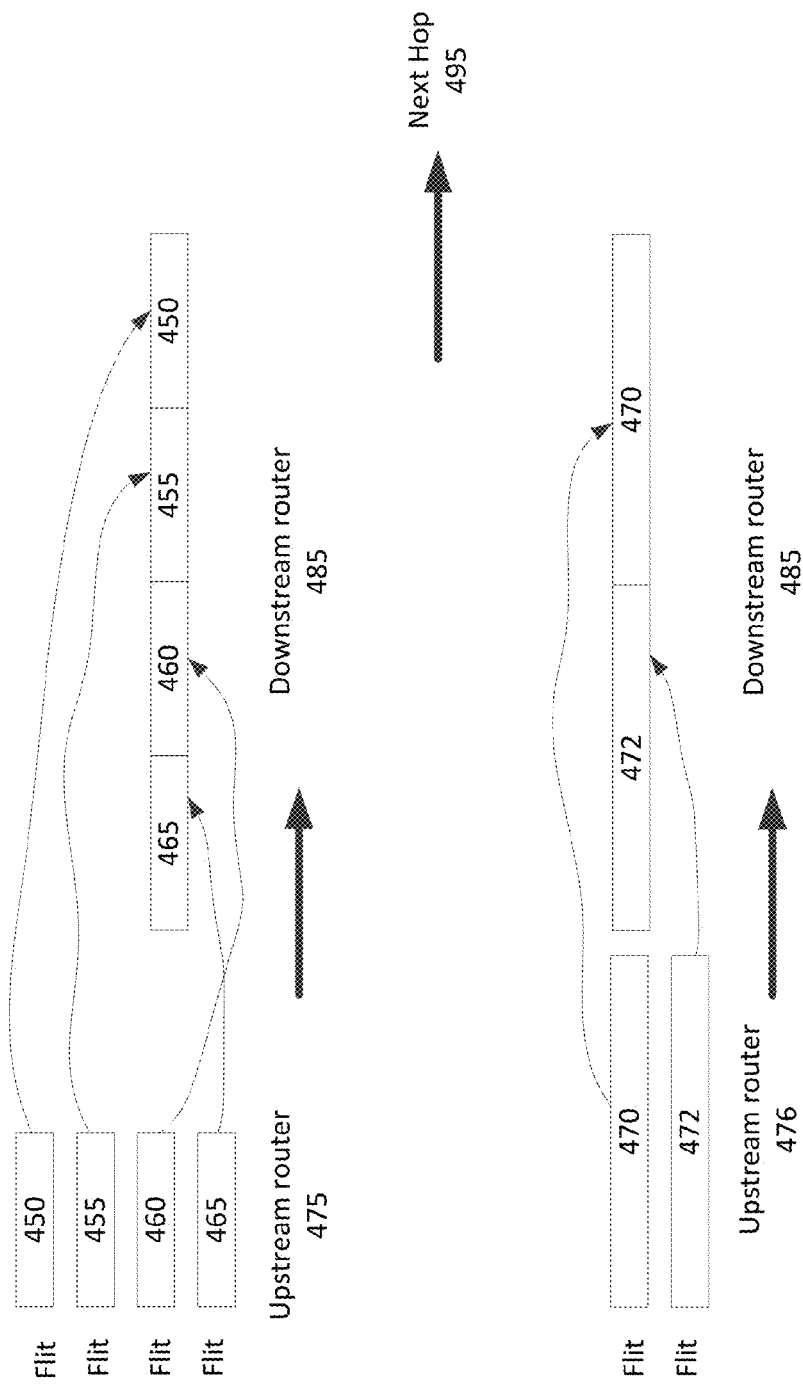
FIG. 4B illustrates an example of link width conversion.

FIG. 4B illustrates an example of link width conversion. In this example, there are two upstream routers 475 and 476, and one downstream router 485. The upstream routers 475, 476 and the downstream router 485 may be configured to have different output port width and input port width. For example, the width of an output port of the upstream router 475 may be 64 bits while the width of the input port of the downstream router 485 may be 256 bits. As such, the downstream router 485 may need to accumulate four flits 450, 455, 460 and 465 from the upstream router 475 before the accumulated flits may be ready for arbitration in the downstream router 485. Similarly, the width of the upstream router 476 may be 128 bits, and the downstream router 485 may need to accumulate two flits 470 and 472 from the upstream router 476 before the accumulated flits may be ready for arbitration in the downstream router 485. This is referred to as narrow-to-wide link conversion. The link conversion module 519 (shown in FIG. 5) may perform link conversions for the flits coming from the upstream routers 475 and 476. The upstream router 475 may be forwarding one flit at a time. As such, the downstream router 485 may wait until all four flits 450, 455, 460 and 465 are received before arbitration is performed by the VA module and the SA module in the downstream router 485. When access to an output port of the downstream router 485 is granted, the four flits 450, 455, 460 and 465 may be forwarded together as a chunk to the next hop 495. If the width of the input port of the downstream router 485 is 16 bits instead of 256 bits, a wide-to-narrow link conversion may be performed. In this situation, the flit 450 may be broken up into smaller flits.

A packet may include control information (or a header) portion and a data (or payload) portion. When the packet is converted into the flits, each of the header portion and the payload portion may include multiple flits. For some embodiments, the link width conversion module 519 of a downstream router may pack or unpack the flits received from the upstream router, update the flit control filed so that the flit type of the incoming flits matches with the flit type of the outgoing flits, and other functions. The link width conversion module 519 may not modify the data included in the payload portion.

For some embodiments, a minimum amount of storage to be allocated to the VC storage is configured based on a width conversion ratio associated with a particular input VC. As mentioned, each input VC is associated with its own reserved VC storage and a shared VC storage. When there is a N2W link width conversion, there should be enough storage to support a maximum N2W link width conversion for the particular VC. Thus, the reserved VC storage for each input VC may need to have enough entries to support the N2W width conversion. For example, when there is a link width conversion ratio of 1:4, the VC storage needs to include at least 4 entries in order to support 1:4 conversion ratio. Even when the flits are placed into the shared VC storage, they are still identifiable as being associated with their corresponding input VCs. It may be possible for a header flit associated with a packet to be stored in the reserved VC storage while the body flits and tail flit associated with the same packet may be stored in the shared VC storage.

Credit-based Flow Control

Figure 5:
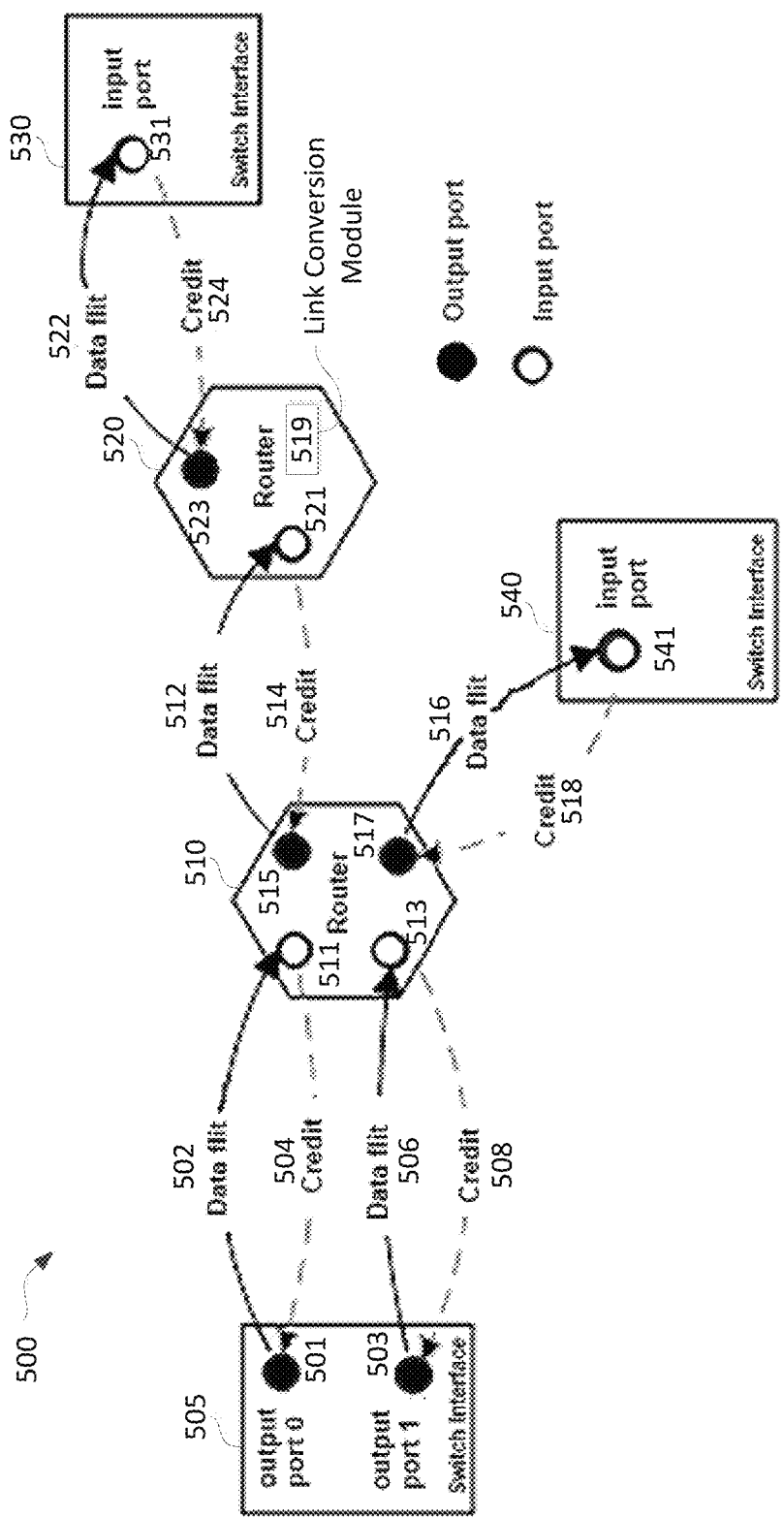
FIG. 5 is a block diagram that illustrates intra-fabric communication.

FIG. 5 is a block diagram that illustrates intra-fabric communication. Diagram 500 includes fabric interfaces 505, 530 and 540, and routers 510 and 520. The fabric interface 505 may be associated with a master core or an IC. The fabric interfaces 530 or 540 may be associated with a slave core or a TC. For some embodiments, a sender-adaptive credit-based flow control is used to manage the communications among the routers 510, 520 and the fabric interfaces 505, 530 and 540. A small set of signals (referred to as credit signals) in a downstream-to-upstream direction may be used to implement the credit flow control. With credit-based flow control, the upstream router may keep a count of the free buffers in each input VC of the downstream router.

A positive credit count in an upstream router may indicate that the downstream router has sufficient resources such as, for example, channel bandwidth, buffer capacity, and channel control states. For example, each time a flit 512 is forwarded from the upstream router 510 to the downstream router 520, the upstream router 510 may decrement its credit count by one. When a flit 522 leaves the downstream router 520, more resources (e.g., free storage) become available in the downstream router 520. The downstream router 520 sends a credit 514 to the upstream router 510. Upon receiving the credit 514, the upstream router 510 may increment its credit count 625 (shown in FIG. 6) by one. The credit count 625 may represent the number of flits that the downstream router 520 may be willing to accept from the upstream router 510. It may also represent the number of free buffer space that the downstream router 520 currently has available. It is possible that the credit count 625 may at certain time reach a value of zero. This indicates that the VC storage associated with the input VC in the downstream router 520 may be completely occupied, and the downstream router 520 is not ready to receive any further flits from the upstream router 510 for the particular input VC. Similar communication including the forwarding of the flits and the sending of the credits may occur between the fabric interface 505 and the router 510, between the router 510 and the fabric interface 540, and between the router 520 and the fabric interface 530. Each of the routers 510 and 520 may include link conversion logic or module such as the link conversion module 519.

Figure 6:
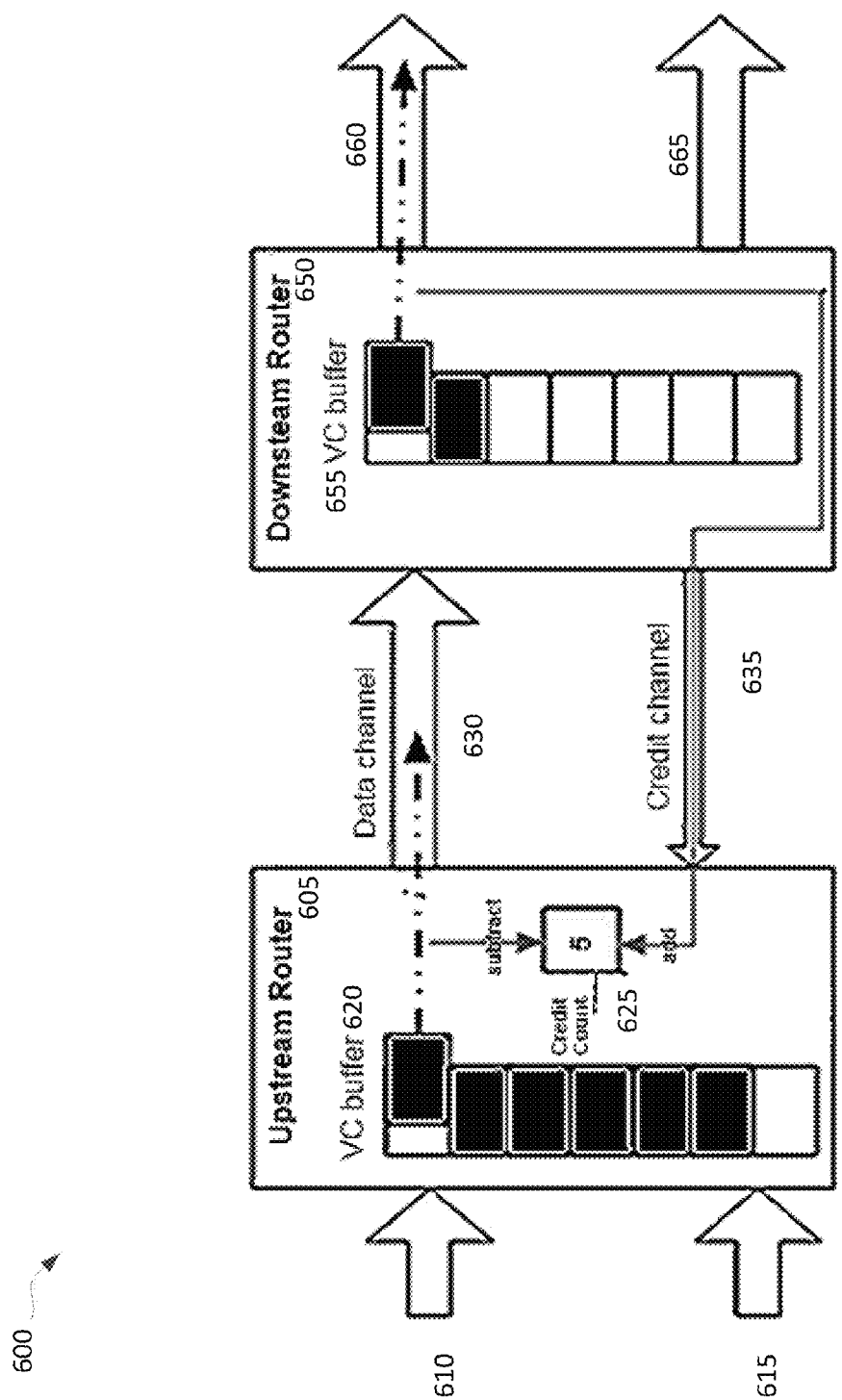
FIG. 6 is a block diagram that illustrates an embodiment of a credit-based flow control mechanism.

FIG. 6 is a block diagram that illustrates an embodiment of a credit-based flow control mechanism. Diagram 600 includes an upstream router (or sender) 605 and its VC storage 620, and a downstream router 650 (or receiver) and its VC storage 655. Also illustrated in the upstream router 605 is a credit count 625. In the example, the current credit count is five (5). This value indicates that there are five empty slots in the input VC storage 655 of the downstream router 650 for a particular input VC. For some embodiments, one credit is associated with a specific amount of buffer space. For example, one credit is associated with a buffer space that can accommodate one flit. The credit-based flow control mechanism adopts adaptive buffer allocation to improve input VC buffer utilization. This allows multiple input VCs to share the same buffer storage in the downstream router 650 if needed.

The upstream router 605 may include multiple input VCs including the input VCs 610 and 615. When a unit of data (e.g., a flit) from the input VC storage (reserved or shared) 620 is forwarded from the upstream router 605 to the downstream router 650 via the data channel 630, the credit count 625 is reduced by one. As long as the credit count 625 is greater than zero, the upstream router 605 may continue to forward another flit to the downstream router 650. The upstream router 605 will not forward any flits to the downstream router 650 if the credit count 625 is zero. When a flit is forwarded out of the input VC storage 655 of the downstream router 650, a credit may be sent by the downstream router 650 to the upstream router 610 via the credit channel 635. The credit count 625 is then increased by one. The credit count 625 is described in more details with the credit tracking module 705 in FIG. 7.

Each router may have multiple output ports or data channels such as the data channels 660 and 665 of the downstream router 650 and the data channel 630 of the upstream router 605. It may be noted that the flit associated with the VC storage/buffer 655 may have a larger width or narrower than the flit associated with the VC storage/buffer 620. For the example, when the size of the flit is 64 bits and the size of each unit of the VC storage 620 is 256 bits, the ratio is 1 to 4. In some embodiments, using the current example, when a flit is forwarded out of the downstream router 650, four (4) separate credits may be sent to the upstream router 605, one at a time within each clock cycle. In some embodiments, the forwarding of a flit in the data channel 630 and the sending of a credit in the credit channel 635 may occur almost simultaneously when there are sufficient credits. That is, the upstream router 605 may not have to wait to receive all four credits from the downstream router 650 before forwarding another flit to the downstream router 650. However, when there is zero credit, the upstream router may have to wait for the downstream router to forward the entire chunk of flits. For example, when there is a 1:4 N2W conversion ratio, the upstream router may have to wait for the downstream router to forward the first, second, third and fourth flit before a first credit is received. As mentioned, each credit is received per VC per clock cycle. In this example, the upstream router may not have to wait to receive the fourth credit to start forwarding a next flit to the downstream router. Instead, the upstream router may start forwarding as soon as the first credit is received.

Figure 7:
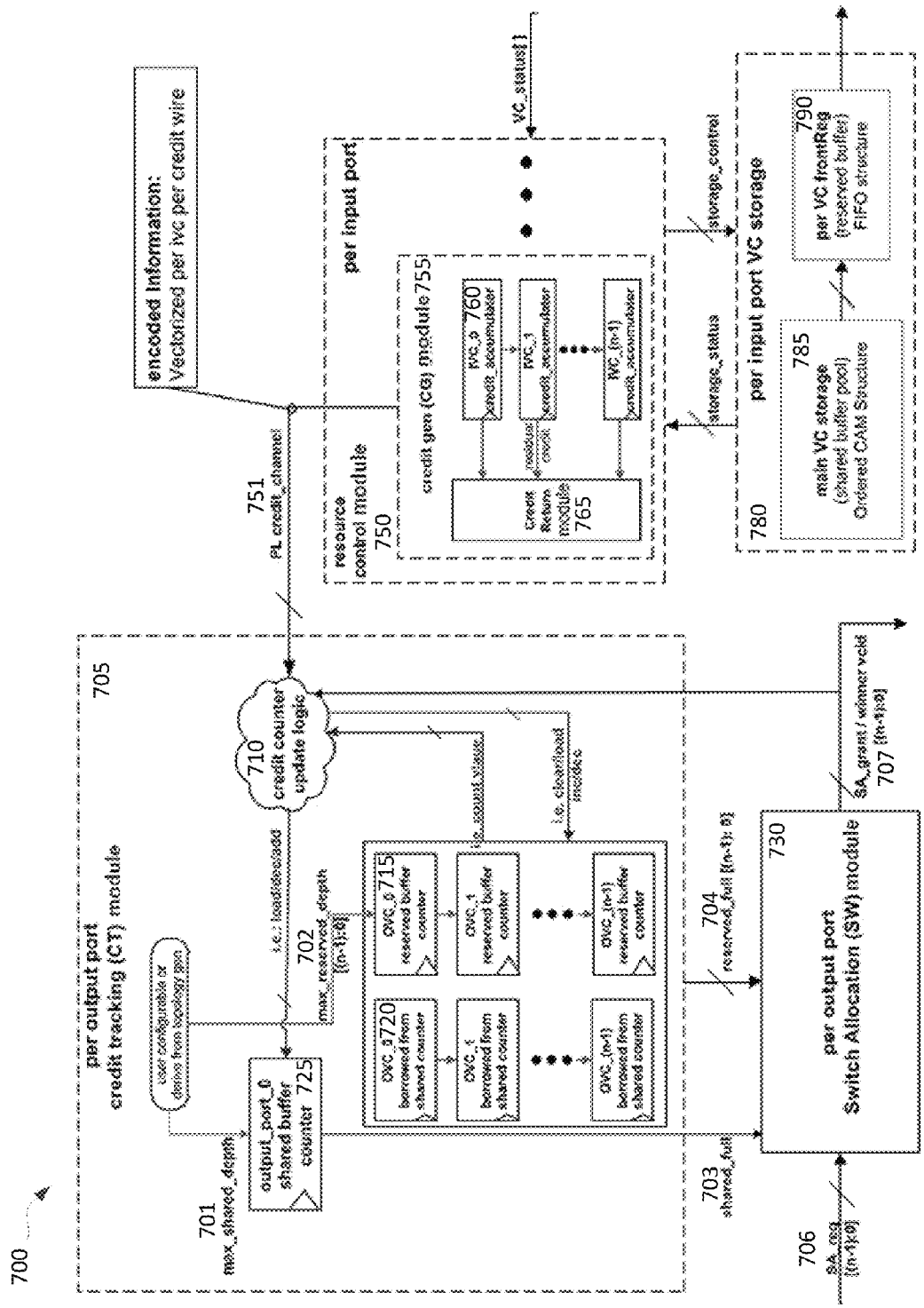
FIG. 7 illustrates an embodiment of a credit tracking mechanism and related logic used for flow control.

FIG. 7 illustrates an embodiment of a credit tracking mechanism and related logic used for flow control. Diagram 700 includes a credit tracking module 705, switch allocation module 730, resource control module 750, and VC storage 780. These modules may be included in a router such as those described in FIGS. 2-5. The credit tracking module 705 is based on per output port and may include credit counter update logic 710, reserved-buffer counter 715 for each of the output VCs, and borrowed-from-shared buffer counter 720 for each output VCs. The VC storage 780 is per input port and includes a shared VC storage 780 and a reserved VC storage 790. The resource control module 750 is per input port and includes a credit generation module 755. The credit generation module 755 may include a credit accumulator 760 for each of the input VCs and a credit return module 765. The resource control module 750 and its credit generation module 755 may be viewed logically as being located in the frontend of the router, while the credit tracking module 705 may be viewed logically as being located in the backend of the router.

The resource control module 750 issues the read/write controls to the VC storage 780. When a flit arrives at the input port, the resource control module 750 loads the flit into the correct VC storage space based on the condition of the VC storage and the state of the input VC that the incoming flit is associated with. The VC storage 780 may be located in the input port of the router and may be partitioned into a shared VC storage 785 and the reserved VC storage 790. The shared VC storage 785 is shared among all of the input VCs within the same input port and can be accessed by any input VC that is granted the access right of the upstream router's output port. The reserved VC storage 790 is dedicated and can only be used by its assigned input VC.

The shared VC storage 785 located inside each input port is shared among all the input VCs of the input port. The flits belonging to the same input VC are stored in order and retrieved in a first-in first-out (FIFO) basis. For some embodiments, the shared input VC storage is implemented using a multi-ported content-addressable memory (CAM) structure, which has one write port and multiple read ports. The number of CAM read ports may be equal to the number of input VCs that the input port hosts.

The incoming flit at each input port may be examined before it is loaded into the appropriate VC storage. Each flit may have a control field and a payload field. Each flit may contain packet-level and flit-level state information extracted from the original flit fields, which may include the decoded routing field and flit type. When the incoming flit is the first header of a packet, the current hop route information may be extracted from the incoming flit and inserted into the header of the outgoing flit.

The credit generation module 755 is configured to monitor the occupancy status of the input VC storage 780 and generates new credit whenever a flit departs the VC storage 780. The credit tracking module 705 is configured to keep the credit count current for each output VC and provides the SA module 730 an accurate state of the credit usage of each output VC. For some embodiments, only those output VCs with non-zero credit are allowed to send flits downstream.

The credit channel 751 may be used to communicate the credit information. The credit channel 751 may connect an input port of a downstream router with an output port of an upstream router. The channel width of the credit channel 751 may be defined by a width parameter having a value equal to a number of input VCs contained in the input port of the downstream router. A bit-vector style encoding scheme may be used to encode the credit information. The credit channel 751 may be viewed as a bit vector where each line (also referred to as a credit line) of the channel is an element in the vector. For example, a credit channel of width "n" may be used to encode credit information for "n" input VCs at the input port of a downstream router, with one credit line in the "n" width credit channel for each input VC.

For some embodiments, only one credit per input VC can be transmitted to the upstream router via the credit channel 751 during one clock cycle. It may be noted that a credit may be given when a buffer space in the VC storage is freed. It is possible that the free buffer space may be part of the reserved VC storage 790, or it may be part of the shared VC storage 785. This distinction is not communicated in the credit channel 751. For some embodiments, the credit tracking module 705 at the upstream router may keep track of whether the free space associated with a credit is from the reserved VC storage 790 or from the shared VC storage 785. For some embodiment, a refill process may be performed to refill an input VC reserved storage with a flit stored in the input VC shared storage inside the input port.

For some embodiments, from the system perspective, the information carried by the credit channel 751 may be considered as always valid, except during reset. When the reset signal is de-asserted, the credit tracking module 705 of the downstream router evaluates or decodes the incoming credit information every clock cycle. The credit generation module 755 of the downstream router may need to ensure the validity of the credit information returned even in the clock cycle when no credit is generated.

Credit Tracking

The credit tracking module 705 is instantiated for each output port at the upstream router. The credit tracking module 705 monitors the usage of the input VC storage 780 inside the input port of the downstream router. Since each output port may have only one incoming credit channel, there is one credit tracking module 705 per output port. The credit tracking module 705 is configured to interact with the SA module 730 to provide the current credit balance to the SA module 730 and obtain the current credit consumption status from the SA module 730. The credit tracking module 705 is also configured to evaluate the incoming credit information, determine the type of the per input port VC credit, and update the credit balance for both the shared credit and per output port VC reserved credit.

The credit tracking module 705 is configured to receive the credit channel signals from the downstream router and the grant signal 707 from the SA module 730. This grant signal may be interpreted as a consumed credit. The credit tracking module 705 may generate two VC storage status signals. A first VC storage status signal is used to indicate whether the shared VC storage 785 is full. A second VC storage status signal is used to indicate whether the reserved VC storage is full. When the first VC storage status signal is asserted, it may be interpreted that the shared VC storage 785 is fully occupied, and therefore no shared credit is available for all output VCs in this output port. When the second VC storage status signal is asserted, it may be interpreted that the reserved VC storage 790 for a particular input VC is exhausted, and therefore no reserved credit is available the particular output VC.

The SA module 730 of the output port uses the first VC storage status signal (for the shared storage) and the second VC storage status signal (for the reserved storage) to filter out the arbitration requests sent to the SA module 730 via the SA request signal 706. When the first VC storage status signal is not asserted, all of the arbitration requests received via the SA request signal 706 may be evaluated by the SA module 730. When the first VC storage status signal is asserted, the arbitration requests from the output VCs that have used up their reserved VC storage (i.e., the second VC storage status signal is asserted) may not be evaluated by the SA module 730.

The credit tracking operations performed by the credit tracking module 705 may involve determining the type of the incoming credits (shared or reserved), and updating the value of the appropriate credit counters. For some embodiments, when the assertion of the credit line signal and the SA grant signal 707 happen to the same output VC within a clock cycle, the values of the counters may be updated taking into account of both conditions. The updated value of the counters may reflect the overall value in that cycle. It may be noted that there can be more-than-one input VCs returning credit to the shared counter within the same clock cycle. It may be necessary that the allocation of the VC storage starts first with the reserved VC storage before requesting for the shared VC storage. This allocation may be managed by the credit tracking module 705 at the upstream router through proper credit balance update. Maintaining the borrowed-from-shared credit counter 720 ensures that each output VC only returns the amount of credits it consumed from the shared VC storage.

Credit Counters

To track the credit balance for both shared credit and per output VC reserved credit, a set of counters are employed in the credit tracking module 705. They include a shared-credit counter 725, a reserved credit counter 715, and a borrowed-from-shared counter 720. The shared-credit counter 725 is instantiated one per credit tracking module 705 and initialized to a predetermined maximum value (illustrated as max-shared-depth 701) upon system reset. The value of the shared-credit counter 725 represents the current balance of the credit(s) shared among all output VCs within the output port. When the value of the shared-credit counter 735 is zero, the appropriate VC storage status signal such as the shared-full signal 705 is asserted to indicate that the shared VC storage 785 is fully occupied.

The reserved credit counter 715 is instantiated one per output VC and is initialized to a predetermined maximum value (illustrated as max-reserved-depth 702) upon system reset. The value of the reserved credit counter 715 represents the current balance of the credit(s) reserved for the particular output VC. When the value of the reserved credit counter 715 is zero, the appropriate VC storage status signal such as the reserved-full signal 704 is asserted to indicate that the reserved VC storage 790 is fully occupied.

The borrowed-from-shared counter 720 is instantiated one per output VC and is initialized to zero upon system reset. The value of the borrowed-from-shared counter 720 represents the number of shared credit(s) that a particular output VC has borrowed. A maximum number of shared credits that the particular output VC is allowed to consume may be used to determine the counter size. A zero count value indicates that the particular output VC has not used any shared credits.

Credit Generation

The credit generation module 755 is instantiated per outgoing credit channel at the downstream input port. The credit generation module 755 includes a credit return module 765 and multiple credit accumulator modules 760. Since each input port has only one outgoing credit channel, there is one credit generation module 755 per input port. The credit generation module 755 is configured to generate and accumulate credit(s) for each input VC. The credit generation module 755 is also configured to send the generated credit when the credit return condition is met. It may be noted that no credit may be sent to the upstream router even after the downstream router has accumulated enough flits to fill one buffer slot (e.g., in a N2W conversion) for a particular input VC. This is because the arbitration may not be granted (via the SA grant signal 707) to the particular input VC; otherwise, an overflow condition may occur. Along the same line, it may be necessary to send the credit as soon as the buffer space in the VC storage becomes available. Sending the credit too late may result in underutilization of the buffer space.

The credit generation module 755 may be oblivious of credit type (shared or reserved). When the credit return condition is not met for a particular input VC, the generated credit on that input VC needs to be remembered by a credit accumulation counter 760. The credit accumulation counter 760 may be instantiated for each input VC to track the number of credits to be sent.

For some embodiments, when there is a N2W width conversion (e.g., 1 to 4) for a particular input VC, the number of flits forwarded out of the downstream router is equal to the number of narrower flits received from the upstream router. For example, after four narrower flits are received one by one from the upstream router, those four are packed and forwarded out of the downstream router as one wider flit. The credit is ready for the particular input VC when the SA is granted via the grant signal 707 to the packed four (4) flits on the particular input VC. When there is a W2N width conversion (e.g., 2 to 1) for a particular input VC, the incoming wider flits (e.g., 1 flit) are broken up to match with the outgoing narrow flits (e.g., 2 smaller flits or 2 chunks). The credit is ready for the particular input VC when the SA is granted to the last chunk in the wider flit. In other words, the credit is sent to the upstream router when the wider flit (received from the upstream router) is completely unpacked (e.g., one wider flit unpacked into a group of four narrow flits) and the group of unpacked flits are forwarded out of the router. No link width conversion may be necessary when the size of an incoming flit is equal to the size of an outgoing flit. The credit is ready whenever the SA arbitration is granted via the grant signal 707 to the particular input VC.

Figure 8:
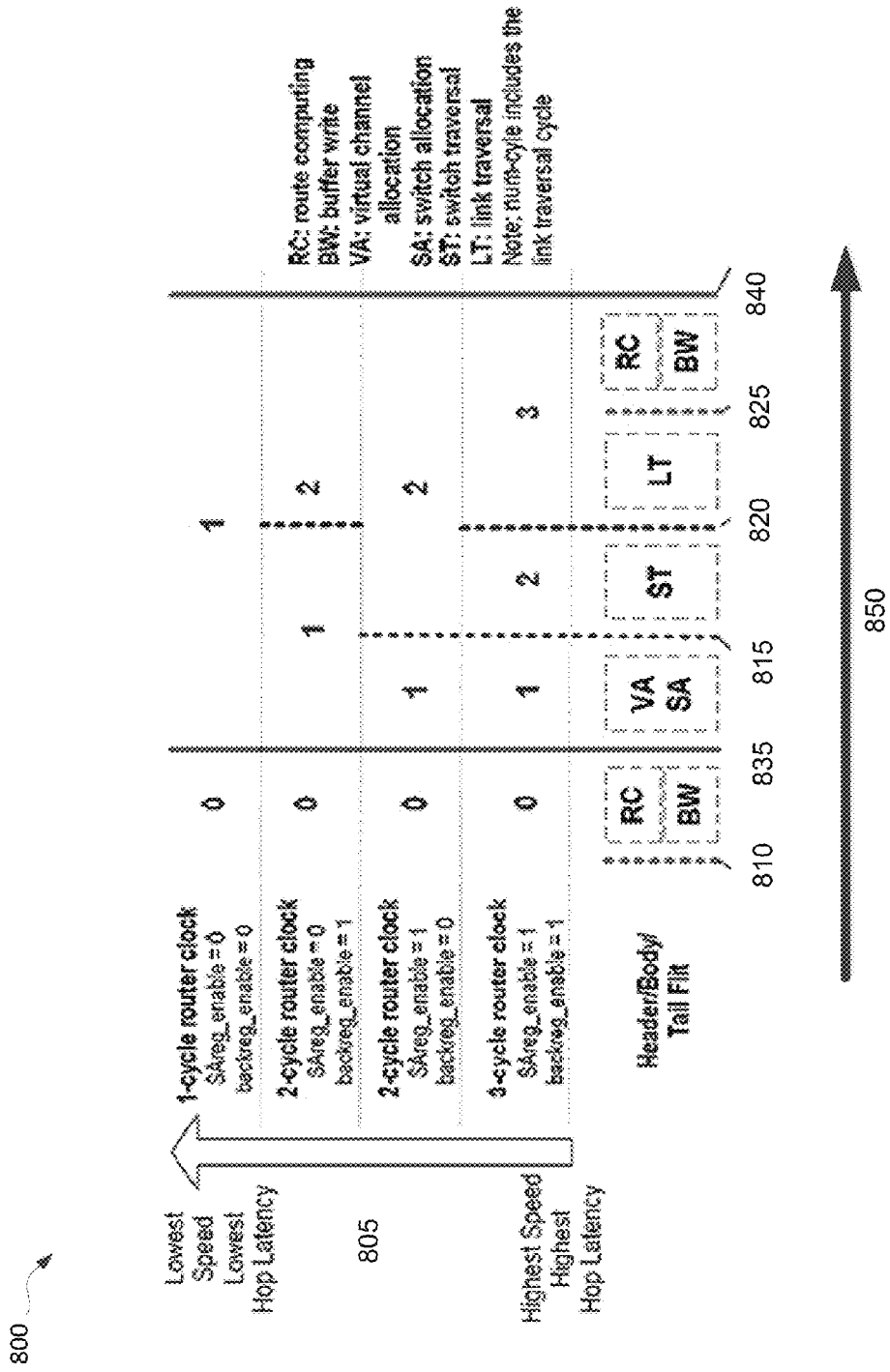
FIG. 8 illustrates examples of different router pipeline configuration embodiments.

FIG. 8 illustrates examples of different router pipeline configuration embodiments. The horizontal arrow 850 represents a time line and the clock cycles during that time line. This includes the clock cycle zero (0) to three (3). The vertical arrow 805 represents the different possible router configurations depending on the preferred design ranging from highest speed/highest hop latency at the bottom to lowest speed/lowest hop latency at the top. The flits travel through the fabric 118 from left to right and cross through router boundaries 810 and 825. The different operations performed by the routers include route computing (RC), buffer write (BW), virtual channel allocation (VA), switch allocation (SA), switch traversal (ST) and link traversal (LT). Lines 835 and 840 represent a non-configurable pipeline point. Lines 815 and 820 represent configurable pipeline points. Each horizontal line represents the different configurations including, for example, 1-cycle router clock, 2-cycle router clock, etc. The back_reg_enable parameter shown with the configurations is used to set the pipeline arrangement of the router. When this parameter is enabled, one additional cycle of fall-through latency is added to the router. The SA_reg_enable parameter shown with the configurations is used to indicate that credit is generated using SA_grant signal 325 (shown in FIG. 3). In the current configuration example, the three-cycle router clock configuration with both of the back_reg_enable and the SA_reg_enable parameters enabled offers the fastest speed and highest hop latency.

Figure 9:
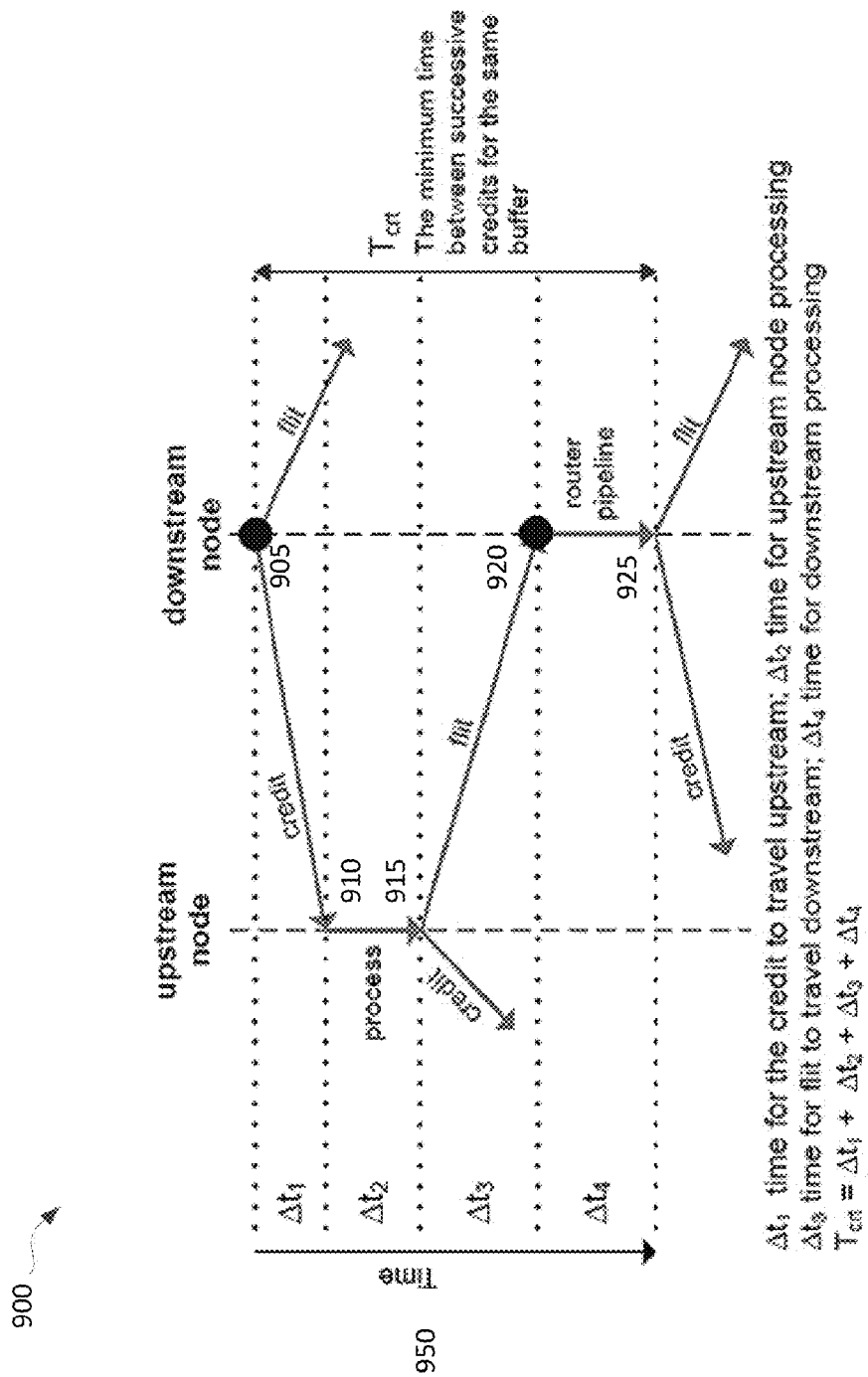
FIG. 9 illustrates an example of a credit loop between two communicating routers.

FIG. 9 illustrates an example of a credit flow. For some embodiments, when maximum throughput of the channel is desired, the VC storage may need to be sized properly to ensure that the throughput of the channel is not restricted by the limited downstream buffer space. At the same time, when the VC storage is too large, it may lead to under-utilized buffer space and unnecessary area cost. Credit round-trip delay is a parameter that may be used to determine the maximum throughput can be supported by a flow control mechanism. The vertical arrow line 950 represents a timeline. The vertical double arrow line on the right side labeled as Tcrt represents the minimum time between successive credits for the same buffer space. The Tcrt refers to the duration between a first time 955 when a first credit associated with a buffer space is sent and a second time 960 when a second credit is sent for the same buffer space.

The Tcrt duration 905-925 in this example includes a round-trip wire delay and the processing time at the downstream router and the processing time at the upstream router. The delta time t1 (from 905 to 910) represents a time for a credit to be sent from a downstream router to an upstream router. The delta time t2 (from 910 to 915) represents a time for the upstream router to process the credit received from the downstream router. The delta time t3 (from 915 to 920) represents a time for a flit to travel from the upstream router to the downstream router. The delta time t4 (from 920 to 925) represents a time for the flit to go through the pipeline processing of the downstream router. After the time 925, the flit is forwarded by the downstream router to the next hop. The time period 905-920 may be referred to as a credit loop. That time period covers a time when a credit associated with a free or vacated buffer space is sent to the upstream router and a time when the same free or vacated buffer space is next occupied by a flit. This credit loop represents a latency associated with the credit-based flow control mechanism described in some embodiments.

Using the Tcrt as a prameter, the amount of buffer space required per VC may be determined using the following formula:

$$\text{Total number of flit buffers} \geq (\text{Tcrt} * \text{channel bandwidth})/\text{flit length in bits}.$$

When the shared VC storage is used, as long as the total amount of available VC storage (shared VC storage plus reserved VC storage) satisfies the above equation, the maximum channel bandwidth may not be limited by the buffer size. It may be noted that different router pipeline configurations (as illustrated in FIG. 8) may result in different VC storage sizing.

For some embodiments, when a flit arrives at the input port, it is decoded. As mentioned, there are three types of flits in a packet: a header flit, a body flit, and a tail flit. The resource control module 750 (illustrated in FIG. 7) may examine the flit control field of an incoming flit to determine its type. The decoded flit type information is loaded into the input VC state FIFO. Different actions may need to be performed for the different types of flits. For example, if a header flit is detected, the outgoing port and the outgoing VC of the arriving packet are computed and stored as part of the state information of the input VC. When the incoming flit is a tail flit, the state information of the input VC may need to be cleared after the switch traversal step to release the input VC for the later packets to use. Besides examining the flit control field, the resource control module 750 may also need to determine the correct storage location to load the incoming flit.

For some embodiments, deterministic source routing mechanism in which routing decisions for a packet may be made in the upstream router based on pre-computed route. The routing algorithm is deterministic because there is only one pre-computed routing path per packet. At each hop, no routing decisions are made and the entire packets go through the same outgoing port on the same outgoing VC determined by the routing field of the header flit. With deterministic source routing, route computation decodes the routing field of the first header flit of a packet and shifts off the examined routing bits to make the routing field current for the next hop.

A flit may be loaded from the VC storage into a register (referred to as a front register) before it enters the switch traversal (ST) state. The front register is used to refill the reserved VC storage with a flit stored in the shared VC storage. When a flit enters the switch traversal (ST) stage, if its associated input VC still has one or more flit stored in the shared VC storage, the vacated front register may need to be refilled to allow a next subsequent flit to advance. The refilling of the front register is a process of refilling a reserved VC storage of an input VC with a flit stored in a shared VC storage inside the input port module 205 (illustrated in FIG. 2). During the normal pipelined operation of the router, the loading of a new flit into the VC storage and the refilling of the front register from the shared VC storage may happen at the same time.

Flow Diagram

Figure 10:
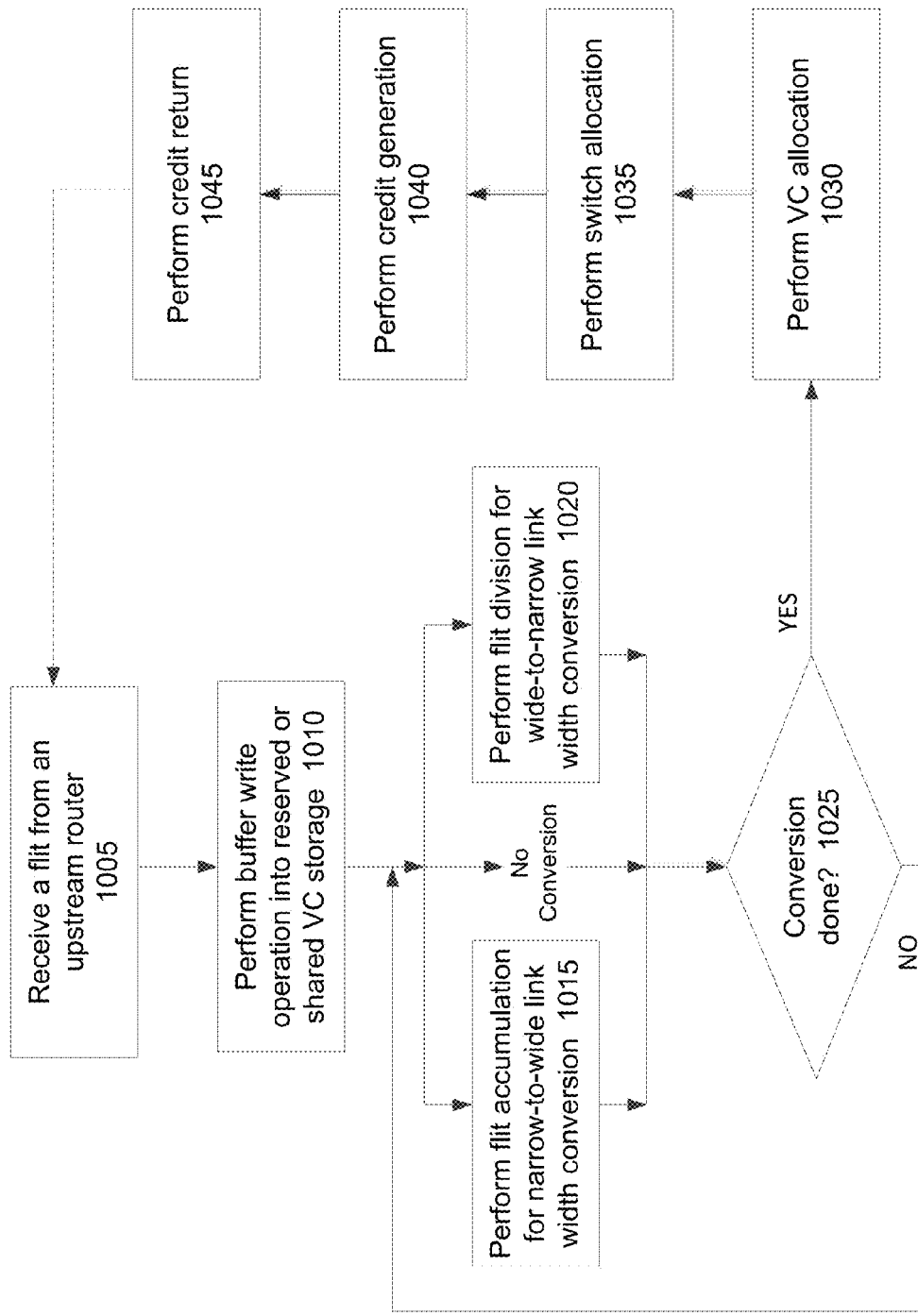
FIG. 10 illustrates a flow diagram of an embodiment of an example of a process that may be performed by a router.

FIG. 10 illustrates a flow diagram of an embodiment of an example of a process that may be performed by a router. The process may be performed by a downstream router and may start at block 1005 where a flit is received from an upstream router. At block 1010, the flit is written into either a shared VC storage or a reserved VC storage associated with an input VC that the flit comes from. Depending on the width of the flit and the width of the output port of the downstream router, link width conversion may or may not occur. When there is a N2W link width conversion, the conversion is performed in block 1015. When there is a W2N link width conversion, the conversion is performed in block 1020. When there is no link width conversion, no conversion operation is performed.

At block 1025, a test is performed to determine if any conversion operation is completed. If more conversion is necessary (e.g., more flits need to be accumulated), the process may return back to a point after the block 1010. If the conversion is not necessary (e.g., when there is no conversion) or if the conversion operation is completed, the process may continue at block 1030 where the VC allocation operation is performed. This allocates an output VC. At block 1035, the switch allocation operation is performed. This allocates an output port to forward the flit to the next hop. The switch allocation operation may be performed after the SA module 730 enables or asserts the grant signal. At block 1040, the credit generation operation is performed. At block 1045, the credit return operation is performed. This operation sends a credit to the upstream router. From block 1045, the process may repeat at block 1005 to receive more flits from the upstream router.

Computer-readable Media

In an embodiment, a non-transitory computer readable storage media contains instructions, which when executed by a machine, the instructions are configured to cause the machine to generate a software representation of an apparatus that includes one or more routers in a fabric of a Network on a Chip (NoC) which encompasses systems including an integrated circuit (IC). One or more routers are configured to propagate flits from source locations to destination locations along inter-router physical links of the fabric of the NoC. The flits include incoming flits and outgoing flits. Each of the routers has one or more input ports and one or more output ports. Each of the routers is configured to (a) implement routing and flow control functions required to buffer any incoming flits from both (i) one or more master Intellectual Property (IP) cores and (ii) one or more slave IP cores, (b) perform link width conversion when width of signal wires connected to an output port is different from width of signal wires connected to an input port, (c) use multiple input virtual channels (VC's) with each input port, wherein each of the input VCs is associated with a first VC storage reserved only for the incoming flits associated with that input VC and a second VC storage shared among the incoming flits of all of the input VCs associated with the input port, (d) use multiple output VCs with each output port, wherein each of the output VCs is used to forward the outgoing flits to a downstream router, wherein each of the output VC is associated with a credit count, and (e) perform flit flow control using credit generation and credit tracking.

Simulation and Modeling

Figure 11:
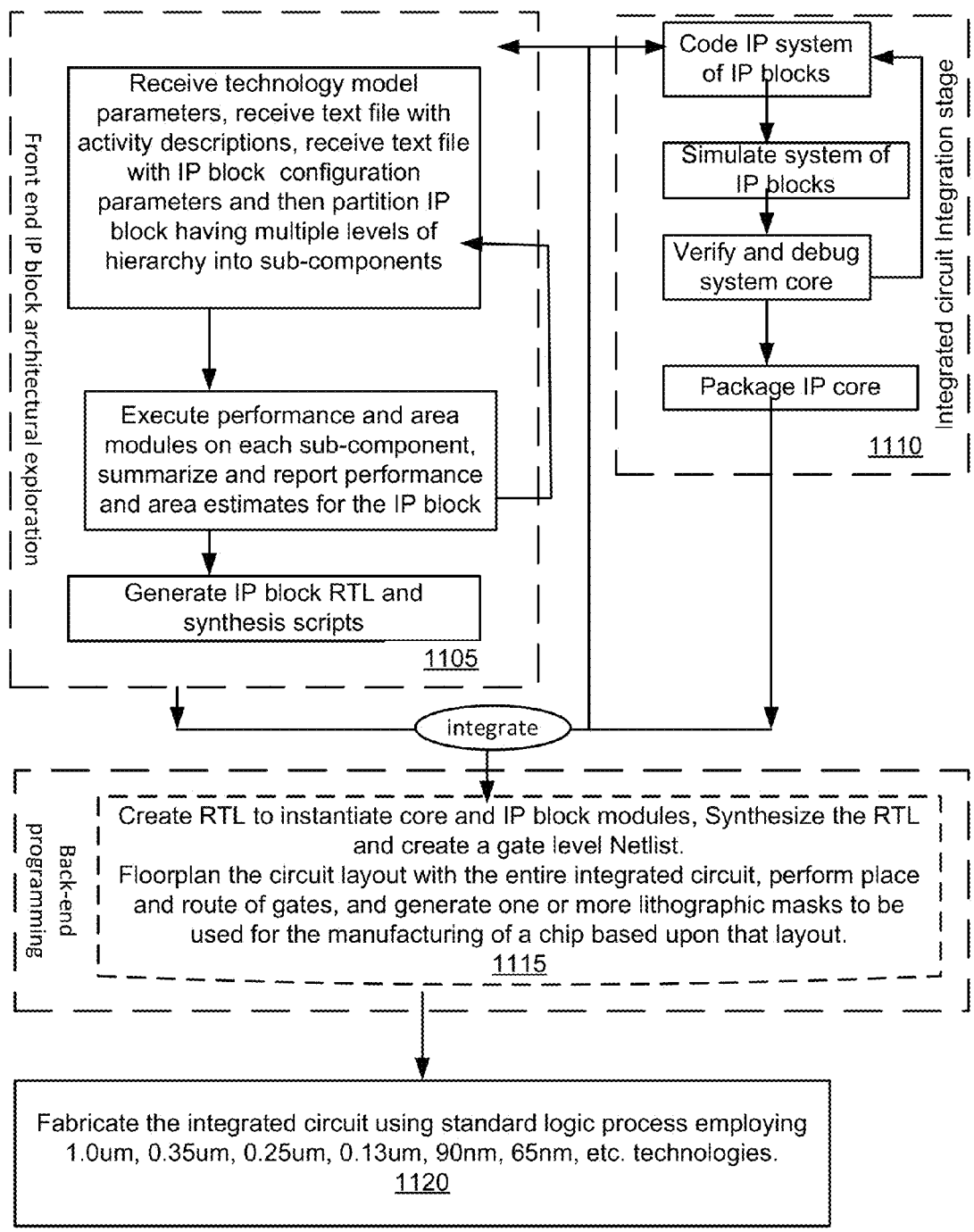
FIG. 11 illustrates a flow diagram of an embodiment of an example of a process for generating a device, such as a System on a Chip.

FIG. 11 illustrates a flow diagram of an embodiment of an example of a process for generating a device, such as a System on a Chip, in accordance with the systems and methods described herein. The example process for generating a device with designs of the Interconnect and Memory Scheduler may utilize an electronic circuit design generator, such as a System on a Chip compiler, to form part of an Electronic Design Automation (EDA) toolset. Hardware logic, coded software, and a combination of both may be used to implement the following design process steps using an embodiment of the EDA toolset. The EDA toolset such may be a single tool or a compilation of two or more discrete tools. The information representing the apparatuses and/or methods for the circuitry in the Interconnect, Memory Scheduler, etc. may be contained in an Instance such as in a cell library, soft instructions in an electronic circuit design generator, or similar machine-readable storage medium storing this information. The information representing the apparatuses and/or methods stored on the machine-readable storage medium may be used in the process of creating the apparatuses, or model representations of the apparatuses such as simulations and lithographic masks, and/or methods described herein.

Aspects of the above design may be part of a software library containing a set of designs for components making up the scheduler and Interconnect and associated parts. The library cells are developed in accordance with industry standards. The library of files containing design elements may be a stand-alone program by itself as well as part of the EDA toolset.

The EDA toolset may be used for making a highly configurable, scalable System-On-a-Chip (SOC) inter block communication system that integrally manages input and output data, control, debug and test flows, as well as other functions. In an embodiment, an example EDA toolset may comprise the following: a graphic user interface; a common set of processing elements; and a library of files containing design elements such as circuits, control logic, and cell arrays that define the EDA tool set. The EDA toolset may be one or more software programs comprised of multiple algorithms and designs for the purpose of generating a circuit design, testing the design, and/or placing the layout of the design in a space available on a target chip. The EDA toolset may include object code in a set of executable software programs. The set of application-specific algorithms and interfaces of the EDA toolset may be used by system integrated circuit (IC) integrators to rapidly create an individual IP core or an entire System of IP cores for a specific application. The EDA toolset provides timing diagrams, power and area aspects of each component and simulates with models coded to represent the components in order to run actual operation and configuration simulations. The EDA toolset may generate a Netlist and a layout targeted to fit in the space available on a target chip. The EDA toolset may also store the data representing the interconnect and logic circuitry on a machine-readable storage medium.

Generally, the EDA toolset is used in two major stages of SOC design: front-end processing and back-end programming. The EDA toolset can include one or more of a RTL generator, logic synthesis scripts, a full verification testbench, and SystemC models.

Front-end processing includes the design and architecture stages, which includes design of the SOC schematic. The front-end processing may include connecting models, configuration of the design, simulating, testing, and tuning of the design during the architectural exploration. The design is typically simulated and tested. Front-end processing traditionally includes simulation of the circuits within the SOC and verification that they should work correctly. The tested and verified components then may be stored as part of a stand-alone library or part of the IP blocks on a chip. The front-end views support documentation, simulation, debugging, and testing.

In block 1105, the EDA tool set may receive a user-supplied text file having data describing configuration parameters and a design for at least part of a tag logic configured to concurrently perform per-thread and per-tag memory access scheduling within a thread and across multiple threads. The data may include one or more configuration parameters for that IP block. The IP block description may be an overall functionality of that IP block such as an Interconnect, memory scheduler, etc. The configuration parameters for the Interconnect IP block and scheduler may include parameters as described previously.

The EDA tool set receives user-supplied implementation technology parameters such as the manufacturing process to implement component level fabrication of that IP block, an estimation of the size occupied by a cell in that technology, an operating voltage of the component level logic implemented in that technology, an average gate delay for standard cells in that technology, etc. The technology parameters describe an abstraction of the intended implementation technology. The user-supplied technology parameters may be a textual description or merely a value submitted in response to a known range of possibilities.

The EDA tool set may partition the IP block design by creating an abstract executable representation for each IP sub component making up the IP block design. The abstract executable representation models TAP characteristics for each IP sub component and mimics characteristics similar to those of the actual IP block design. A model may focus on one or more behavioral characteristics of that IP block. The EDA tool set executes models of parts or all of the IP block design. The EDA tool set summarizes and reports the results of the modeled behavioral characteristics of that IP block. The EDA tool set also may analyze an application's performance and allows the user to supply a new configuration of the IP block design or a functional description with new technology parameters. After the user is satisfied with the performance results of one of the iterations of the supplied configuration of the IP design parameters and the technology parameters run, the user may settle on the eventual IP core design with its associated technology parameters.

The EDA tool set integrates the results from the abstract executable representations with potentially additional information to generate the synthesis scripts for the IP block. The EDA tool set may supply the synthesis scripts to establish various performance and area goals for the IP block after the result of the overall performance and area estimates are presented to the user.

The EDA tool set may also generate an RTL file of that IP block design for logic synthesis based on the user supplied configuration parameters and implementation technology parameters. As discussed, the RTL file may be a high-level hardware description describing electronic circuits with a collection of registers, Boolean equations, control logic such as "if-then-else" statements, and complex event sequences.

In block 1110, a separate design path in an ASIC or SOC chip design is called the integration stage. The integration of the system of IP blocks may occur in parallel with the generation of the RTL file of the IP block and synthesis scripts for that IP block.

The EDA toolset may provide designs of circuits and logic gates to simulate and verify the operation of the design works correctly. The system designer codes the system of IP blocks to work together. The EDA tool set generates simulations of representations of the circuits described above that can be functionally tested, timing tested, debugged and validated. The EDA tool set simulates the system of IP block's behavior. The system designer verifies and debugs the system of IP blocks' behavior. The EDA tool set tool packages the IP core. A machine-readable storage medium may also store instructions for a test generation program to generate instructions for an external tester and the interconnect to run the test sequences for the tests described herein. One of ordinary skill in the art of electronic design automation knows that a design engineer creates and uses different representations, such as software coded models, to help generating tangible useful information and/or results. Many of these representations can be high-level (abstracted and with less details) or top-down views and can be used to help optimize an electronic design starting from the system level. In addition, a design process usually can be divided into phases and at the end of each phase, a tailor-made representation to the phase is usually generated as output and used as input by the next phase. Skilled engineers can make use of these representations and apply heuristic algorithms to improve the quality of the final results coming out of the final phase. These representations allow the electric design automation world to design circuits, test and verify circuits, derive lithographic mask from Netlists of circuit and other similar useful results.

In block 1115, next, system integration may occur in the integrated circuit design process. Back-end programming generally includes programming of the physical layout of the SOC such as placing and routing, or floor planning, of the circuit elements on the chip layout, as well as the routing of all metal lines between components. The back-end files, such as a layout, physical Library Exchange Format (LEF), etc. are generated for layout and fabrication.

The generated device layout may be integrated with the rest of the layout for the chip. A logic synthesis tool receives synthesis scripts for the IP core and the RTL design file of the IP cores. The logic synthesis tool also receives characteristics of logic gates used in the design from a cell library. RTL code may be generated to instantiate the SOC containing the system of IP blocks. The system of IP blocks with the fixed RTL and synthesis scripts may be simulated and verified. Synthesizing of the design with Register Transfer Level (RTL) may occur. The logic synthesis tool synthesizes the RTL design to create a gate level Netlist circuit design (i.e. a description of the individual transistors and logic gates making up all of the IP sub component blocks). The design may be outputted into a Netlist of one or more hardware design languages (HDL) such as Verilog, VHDL (Very-High-Speed Integrated Circuit Hardware Description Language) or SPICE (Simulation Program for Integrated Circuit Emphasis). A Netlist can also describe the connectivity of an electronic design such as the components included in the design, the attributes of each component and the interconnectivity amongst the components. The EDA tool set facilitates floor planning of components including adding of constraints for component placement in the space available on the chip such as XY coordinates on the chip, and routes metal connections for those components. The EDA tool set provides the information for lithographic masks to be generated from this representation of the IP core to transfer the circuit design onto a chip during manufacture, or other similar useful derivations of the circuits described above.

Accordingly, back-end programming may further include the physical verification of the layout to verify that it is physically manufacturable and the resulting SOC will not have any function-preventing physical defects.

In block 1120, a fabrication facility may fabricate one or more chips with the signal generation circuit utilizing the lithographic masks generated from the EDA tool set's circuit design and layout. Fabrication facilities may use a standard CMOS logic process having minimum line widths such as 1.0 um, 0.50 um, 0.35 um, 0.25 um, 0.18 um, 0.13 um, 0.10 um, 90 nm, 65 nm or less, to fabricate the chips. The size of the CMOS logic process employed typically defines the smallest minimum lithographic dimension that can be fabricated on the chip using the lithographic masks, which in turn, determines minimum component size. According to one embodiment, light including X-rays and extreme ultraviolet radiation may pass through these lithographic masks onto the chip to transfer the circuit design and layout for the test circuit onto the chip itself.

The EDA toolset may have configuration dialog plug-ins for the graphical user interface. The EDA toolset may have an RTL generator plug-in for the SocComp. The EDA toolset may have a SystemC generator plug-in for the SocComp. The EDA toolset may perform unit-level verification on components that can be included in RTL simulation. The EDA toolset may have a test validation testbench generator. The EDA toolset may have a dis-assembler for virtual and hardware debug port trace files. The EDA toolset may be compliant with open core protocol standards. The EDA toolset may have Transactor models, Bundle protocol checkers, OCPDis2 to display socket activity, OCPPerf2 to analyze performance of a bundle, as well as other similar programs.

As discussed, an EDA tool set may be implemented in software as a set of data and instructions, such as an instance in a software library callable to other programs or an EDA tool set consisting of an executable program with the software cell library in one program, stored on a machine-readable medium. A machine-readable storage medium may include any mechanism that stores information in a form readable by a machine (e.g., a computer). For example, a machine-readable medium may include, but is not limited to: read only memory (ROM); random access memory (RAM); magnetic disk storage media; optical storage media; flash memory devices; DVD's; EPROMs; EEPROMs; FLASH, magnetic or optical cards; or any other type of media suitable for storing electronic instructions. The instructions and operations also may be practiced in distributed computing environments where the machine-readable media is stored on and/or executed by more than one computer system. In addition, the information transferred between computer systems may either be pulled or pushed across the communication media connecting the computer systems.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In an embodiment, the logic consists of electronic circuits that follow the rules of Boolean Logic, software that contain patterns of instructions, or any combination of both. Various components described above may be implemented in hardware logic, software, or any combination of both. While some specific embodiments of the invention have been shown the invention is not to be limited to these embodiments. For example, most functions performed by electronic hardware components may be duplicated by software emulation. Thus, a software program written to accomplish those same functions may emulate the functionality of the hardware components in input-output circuitry. The invention is to be understood as not limited by the specific embodiments described herein, but only by scope of the appended claims.

We claim:

1. An apparatus, comprising:
   two or more routers in a fabric of a Network on a Chip (NoC) for an integrated circuit,
      wherein the two or more routers are configured to propagate flits from source locations to destination locations along inter-router physical links of the fabric of the NoC,
         where the two or more routers include at least an upstream router and a downstream router,
         where the flits include incoming flits and outgoing flits;
   each of the routers has one or more input ports and one or more output ports,
      wherein the downstream router has two or more input virtual channels (VCs) for each input port,
      wherein a first input VC for a first input port is associated with a first dedicated storage mechanism reserved only for the incoming flits associated with the first input VC,
      wherein a second input VC for the first input port is associated with a second dedicated storage mechanism reserved only for the incoming flits associated with the second input VC,
      wherein the first input VC and the second input VC are associated with a third shared storage mechanism shared among the incoming flits of all of the input VCs associated for the first input port,
      wherein the incoming flits received from the upstream router into the first input VC are stored in the third shared storage mechanism when there is not sufficient space in the first dedicated storage mechanism,
      wherein the upstream router has one or more output VCs associated with each output port,
      wherein each of the output VCs is configured to forward the outgoing flits to the downstream router,
      wherein each of the output VCs is associated with each output VC's own credit count; and
   credit logic configured to perform flit flow control to forward a first outgoing flit to the downstream router using credit generation and credit tracking based on each output VC's associated credit count.

2. The apparatus of claim 1,
   where the credit logic is configured to indicate a positive credit count in the upstream router for the first input VC when the downstream router has sufficient storage capacity between the first dedicated storage mechanism reserved only for the incoming flits for the first input VC and the third shared storage mechanism shared among the incoming flits of all of the input VCs to receive another flit, and when a first incoming flit into the first input VC of the first input port is forwarded from a first output VC of the upstream router to the downstream router, then the credit logic is configured to decrement a credit count by one of the first output VC of the upstream router, and when a second flit leaves the downstream router then the credit count is restored by one to the first output VC of the upstream router, where the first outgoing flit is one of a plurality of pieces of making up a packet originated from a first Intellectual Property (IP) core and to be forwarded through the fabric by the two or more routers to a second IP core.

3. The apparatus of claim 1, wherein the credit logic consists of:
  a credit tracking module associated with each output port connected to the downstream router,
    where the credit tracking module is configured to keep track of credit usage of each of the output VCs connected to that output port such that only the output VCs having a non-zero credit count are allowed to forward the outgoing flits to the downstream router, and
  a credit generation module associated with the first input port, which is configured to monitor occupancy status of the first dedicated storage mechanism and the third shared storage mechanism and is configured to generate credits when the incoming flits depart from the first dedicated storage mechanism and the third shared storage mechanism.

4. The apparatus of claim 1, where the credit logic is configured such that when zero credits exist in the upstream router for the first input VC it is indicated that the storage mechanisms associated with the first input VC in the downstream router are completely occupied in both the first dedicated storage mechanism for the first input VC and the third shared storage mechanism shared among all of the two or more input VCs, and the downstream router is not ready to receive any further flits from the upstream router for the first input VC but could receive one or more flits for the second input VC when positive credits still exist for the second input VC.

5. The apparatus of claim 1, wherein the credit logic is configured to receive a request from the first input VC to forward the incoming flits on from a first output VC associated with an output port of the upstream router,
  wherein the output port is associated with a plurality of output VCs;
  an arbitrator configured to arbitrate the request from the first input VC to forward the flits together with other requests from other input VCs to forward the flits to determine which said flit is selected as a winner of an input VC arbitration; and
    where the upstream router is further configured to forward the winner flit of the input VC arbitration over to the first input VC.

6. The apparatus of claim 1, wherein each of the two or more routers is further configured to include:
  an input port module configured to manage all of the input VCs associated with the first input port and storage of the incoming flits into various storage mechanisms including the first dedicated storage mechanism, the second dedicated storage mechanism, and the third shared storage mechanism; and a route computing module coupled with the input port module,
  where the route computing module is configured to examine a routing field in a header flit of the incoming flits and then determine a first output VC and a first output port of the downstream router through which the incoming flits are to be routed within a first router.

7. The apparatus of claim 1,
wherein each of the two or more routers are configured to process the incoming flits in a pipelined fashion as the flits propagate from one router to another router and through the fabric, and
where a first router and a second router are further configured to implement routing and flow control functions required to buffer any said incoming flits from (i) one or more master Intellectual Property (IP) cores and (ii) one or more slave IP cores,
where the first router is configured to handle master IP core generated flits and the second router is configured to handle slave IP core generated flits.

8. The apparatus of claim 1,
wherein a minimum amount of storage for the first dedicated storage mechanism is configured to be based on a width conversion ratio associated with the first input VC,
where the first input VC is associated with the first dedicated storage mechanism and the third shared storage mechanism, and
when there is a narrow to wide link width conversion between the first input VC of the downstream router and a first output VC of the upstream router, then there should be at least the minimum amount of storage to support a maximum narrow to wide link width conversion for the first input VC.

9. A non-transitory computer readable storage medium containing instructions that, when executed by a machine, causes the machine to generate the instructions, comprising:
  propagating flits, by two or more routers in a fabric of a Network on a Chip (NoC) for an integrated circuit, from source locations to destination locations along inter-router physical links of the fabric of the NoC, including, in the two or more routers, at least an upstream router and a downstream router,
    where the flits include incoming flits and outgoing flits; each of the routers has one or more input ports and one or more output ports,
  wherein the downstream router has two or more input virtual channels (VCs) for each input port,
  associating a first input VC for a first input port with a first dedicated storage mechanism reserved only for the incoming flits associated with the first input VC,
  associating a second input VC for the first input port with a second dedicated storage mechanism reserved only for the incoming flits associated with the second input VC,
  associating the first input VC and the second input VC with a third shared storage mechanism shared among the incoming flits of all of the input VCs associated for the first input port,
  wherein the incoming flits received from the upstream router into the first input VC are stored in the third shared storage mechanism when there is not sufficient space in the first dedicated storage mechanism,
  wherein the upstream router has one or more output VCs associated with each output port, wherein each of the output VCs is configured to forward the outgoing flits to the downstream router, wherein each of the output VCs is associated with each output VC's own credit count; and credit logic configured to perform flit flow control to forward a first outgoing flit to the downstream router using credit generation and credit tracking based on each output VC's associated credit count.

10. A method for communicating on a Network on a Chip, comprising:

using two or more routers in a fabric of the Network on the Chip for an integrated circuit to communicate between Intellectual Property cores, wherein the two or more routers are configured to propagate flits from source locations to destination locations along inter-router physical links of the fabric of the Network on the Chip, where the two or more routers include at least an upstream router and a downstream router, where the flits include incoming flits and outgoing flits, each of the two or more routers has one or more input ports and one or more output ports, wherein the downstream router has two or more input virtual channels (VCs) for each input port;

storing the incoming flits associated with a first input VC, wherein the first input VC for a first input port is associated with a first dedicated storage mechanism reserved only for the incoming flits associated with the first input VC;

storing the incoming flits associated with the first input VC, wherein a second input VC for the first input port is associated with a second dedicated storage mechanism reserved only for the incoming flits associated with the second input VC, wherein the first input VC and the second input VC are associated with a third shared storage mechanism shared among the incoming flits of all of the input VCs associated with the first input port, wherein the incoming flits received from the upstream router in the first input VC are stored in the third shared storage mechanism when there is not sufficient space in the first dedicated storage mechanism;

forwarding the outgoing flits to the downstream router via one or more output VCs of the upstream router, wherein each of the one or more output VCs is associated with each output VC's own credit count; and performing flit flow control to forward a first outgoing flit to the downstream router using credit generation and credit tracking based on each output VC's associated credit count.

11. The method of claim 10, further comprising:

indicating a positive credit count in the upstream router for the first input VC when the downstream router has sufficient storage capacity between the first dedicated storage mechanism reserved only for the incoming flits for the first input VC and the third shared storage mechanism shared among the incoming flits of all of the input VCs to receive another flit, and when a first incoming flit into the first input VC of the first input port is forwarded from a first output VC of the upstream router to the downstream router, then decrementing the positive credit count by one of the first output VC of the upstream router, and when a second flit leaves the downstream router then the positive credit count is incremented by one for the first output VC of the upstream router.

12. The method of claim 10, further comprising:

keeping track of credit usage of each output VC connected to the first input port such that only the output VCs having a non-zero credit count are allowed to forward the outgoing flits to the downstream router, and monitoring occupancy status of the first dedicated storage mechanism and the third shared storage mechanism and generating credits when the incoming flits depart from the first dedicated storage mechanism and the third shared storage mechanism.

13. The method of claim 10, further comprising:

indicating the first input VC in the downstream router is completely occupied in both the first dedicated storage mechanism for the first input VC and the third shared storage mechanism shared among all of the two or more input VCs when zero credits exist for the first input VC, and the downstream router is not ready to receive any further flits from the upstream router for the first input VC but could receive one or more flits for the second input VC when positive credits still exist for the second input VC.

14. The method of claim 10, further comprising:

receiving a request from the first input VC to forward the incoming flits on from a first output VC associated with the one or more output ports of the upstream router, wherein the one or more output ports are associated with a plurality of output VCs;

arbitrating the request from the first input VC to forward the flits together with other requests from other input VCs to forward the flits to determine which said flit is selected as a winner of an input VC arbitration; and forwarding the winner flit of the input VC arbitration over to the first input VC.

15. The method of claim 10, further comprising:

managing all of the input VCs associated with the first input port and storage of the incoming flits into various storage mechanisms including the first dedicated storage mechanism, the second dedicated storage mechanism, and the third shared storage mechanism; and examining a routing field in a header flit of the incoming flits and then determining a first output VC and a first output port of the downstream router through which the incoming flits are to be routed within a first router.

16. The method of claim 10, further comprising:

processing the incoming flits in a pipelined fashion as the flits propagate from one router to another router and through the fabric, and implementing routing and flow control functions required to buffer any said incoming flits from (i) one or more master Intellectual Property (IP) cores and (ii) one or more slave IP cores, where a first router is configured to handle master IP core generated flits and a second router is configured to handle slave IP core generated flits.

17. The method of claim 10, wherein a minimum amount of storage for the first dedicated shared storage mechanism is configured to be based on a width conversion ratio associated with the first input VC, where the first input VC is associated with the first dedicated storage mechanism and the third shared storage mechanism, and when there is a narrow to wide link width conversion between the first input VC of the downstream router and a first output VC of the upstream router, then there should be at least the minimum amount of storage to support a maximum narrow to wide link width conversion for the first input VC.

18. A non-transitory computer readable storage medium containing instructions that, when executed by a machine, cause the machine to generate operations of the method for communicating on the NoC of claim 10.

* * * * *